US012759307B2

(12) United States Patent
Ohara et al.

(10) Patent No.: US 12,759,307 B2
(45) Date of Patent: Oct. 13, 2026

(54) LIQUID EJECTION HEAD AND LIQUID EJECTION APPARATUS

(71) Applicant: CANON KABUSHIKI KAISHA, Tokyo (JP)

(72) Inventors: Manabu Ohara, Tokyo (JP); Koichi Kubo, Kanagawa (JP); Kazuya Yoshii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 18/660,940

(22) Filed: May 10, 2024

(65) Prior Publication Data

US 2024/0375407 A1 Nov. 14, 2024

(30) Foreign Application Priority Data

May 12, 2023 (JP) ................................ 2023-079388
Feb. 29, 2024 (JP) ................................ 2024-030353

(51) Int. Cl.
*B41J 2/175* (2006.01)
*B41J 2/18* (2006.01)

(52) U.S. Cl.
CPC ............ *B41J 2/18* (2013.01); *B41J 2/17596* (2013.01)

(58) Field of Classification Search
CPC ........... B41J 2/175; B41J 2/17596; B41J 2/18
See application file for complete search history.

(56) References Cited

U.S. PATENT DOCUMENTS

| | | | | |
|---|---|---|---|---|
| 10,040,290 | B2 | 8/2018 | Okushima et al. | |
| 10,179,453 | B2 | 1/2019 | Okushima et al. | |
| 10,569,558 | B2 | 2/2020 | Nagai et al. | |
| 10,974,519 | B2 | 4/2021 | Nishizawa et al. | |
| 2016/0059547 | A1* | 3/2016 | Kaneko ................ | B41J 2/04588 347/14 |
| 2023/0191795 | A1 | 6/2023 | Kondo et al. | |
| 2023/0191796 | A1 | 6/2023 | Ohara et al. | |
| 2023/0406000 | A1 | 12/2023 | Yabe et al. | |

FOREIGN PATENT DOCUMENTS

JP 2020-116813 A 8/2020

OTHER PUBLICATIONS

U.S. Appl. No. 18/638,290, Kazuya Yoshii Yushi Kitase Naozumi Nabeshima, filed Apr. 17, 2024.
U.S. Appl. No. 18/754,786, Noriyasu Nagai Naozumi Nabeshima, filed Jun. 26, 2024.
U.S. Appl. No. 18/760,479, Noriyasu Nagai Naozumi Nabeshima Ryoji Inoue Kyosuke Nagaoka Kazuya Yoshii, filed Jul. 1, 2024.

* cited by examiner

*Primary Examiner* — Anh T Vo
(74) *Attorney, Agent, or Firm* — Venable LLP

(57) ABSTRACT

In a liquid ejection head and a liquid ejection apparatus that can suppress reduction of the ejection stability, an opening of a circulation pump connected with a supply port is positioned higher than a discharge port in a vertical direction in a usage orientation of the liquid ejection head, and the discharge port is positioned higher than the supply port in the vertical direction or at the same height as that of the supply port in the vertical direction in the usage orientation of the liquid ejection head.

19 Claims, 25 Drawing Sheets

LIQUID EJECTION HEAD AND LIQUID EJECTION APPARATUS

BACKGROUND OF THE INVENTION

Field of the Invention

The present invention relates to a liquid ejection head and a liquid ejection apparatus.

Description of the Related Art

There has been known a circulation type liquid ejection apparatus that discharges air bubbles in a channel and suppresses thickening of an ink in the vicinity of an ejection port by circulating a liquid by using a circulation pump between a liquid ejection head and a liquid storage unit.

Japanese Patent Laid-Open No. 2020-116813 discloses a liquid ejection apparatus that circulates an ink in a head by a circulation pump mounted in a main body. In a configuration of Japanese Patent Laid-Open No. 2020-116813, the ink supplied from the circulation pump to a first tank is supplied to the liquid ejection head, and the ink that is not ejected by the liquid ejection head is collected into the circulation pump through a second tank.

In the liquid ejection apparatus, the air may enter the inside of a circulation path due to attaching and detaching of the liquid ejection head and the ink tank, seeping of the air penetrating inside the circulation path and the air dissolved in the ink, and the like.

In the configuration of Japanese Patent Laid-Open No. 2020-116813, an ink inlet port in the first tank is positioned vertically higher than an ink supply port that supplies the ink to the head. In a case where the air in the circulation path is increased in the above configuration, there is a possibility that a liquid surface of the ink inlet port recedes, and the air enters the inside of the circulation pump. With the air entering the inside of the circulation pump, there is a possibility that the pumping performance is reduced by a damper effect of the air and the like, a desired circulation flow rate cannot be exerted, and the ejection stability is reduced.

SUMMARY OF THE INVENTION

Therefore, the present invention provides a liquid ejection head and a liquid ejection apparatus that can suppress reduction of the ejection stability.

Therefore, a liquid ejection head of the present invention includes: an ejection module that ejects a liquid; and a pressure control chamber to adjust a pressure of the liquid supplied to the ejection module, in which the liquid is circulated by a circulation pump, which collects the liquid from the ejection module and supplies the liquid to the pressure control chamber, through the ejection module and the pressure control chamber, and in the pressure control chamber, an outlet during the liquid circulation in the circulation pump is positioned higher in a vertical direction than a discharge port to discharge the liquid to the ejection module, and the lowermost portion of the discharge port is positioned higher in the vertical direction than the uppermost portion of a supply port to which the liquid is supplied from the circulation pump.

According to the present invention, it is possible to provide a liquid ejection head and a liquid ejection apparatus that can suppress reduction of the ejection stability.

Further features of the present invention will become apparent from the following description of exemplary embodiments with reference to the attached drawings.

DESCRIPTION OF THE EMBODIMENTS

Figure 1A:
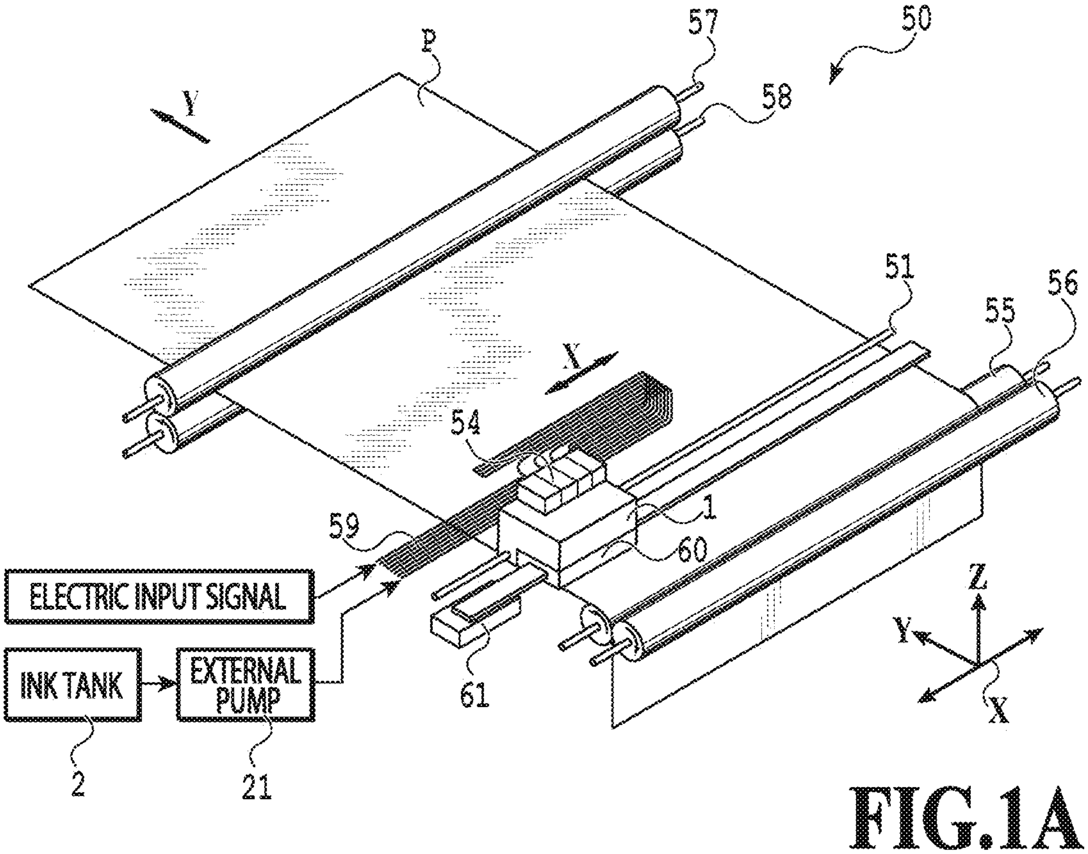
FIG. 1A is a diagram describing a liquid ejection apparatus.

Preferred embodiments of the present disclosure are described below in detail with reference to the appended drawings. Note that the following embodiments are not intended to limit the matters of the present disclosure, and not all the combinations of the characteristics described in the present embodiments are necessarily required for the means for solving the problems of the present disclosure. Note that the same reference numerals are assigned to the same constituent elements. The present embodiment is described by using an example that employs, as an ejection element to eject a liquid, an element that uses a thermal method in which air bubbles are generated by an electrothermal conversion element to eject the liquid; however, it is not limited thereto. The present embodiment is also applicable to a liquid ejection head employing an ejection method in which the liquid is ejected by using a piezoelectric element (piezo) or another ejection method. In addition, a pump, a pressure adjustment unit, and so on described below are not limited to the configurations themselves described in the embodiments and the drawings.

Additionally, although the present embodiment is described by using as an example a liquid ejection apparatus in which a serial scanning type liquid ejection head is mounted, the present embodiment is also applicable to a liquid ejection apparatus in which a line head is mounted. In the descriptions below, first, a basic configuration of the present disclosure is described, and thereafter, a characteristic portion of the present disclosure is described.

<Liquid Ejection Apparatus>

Figure 1B:
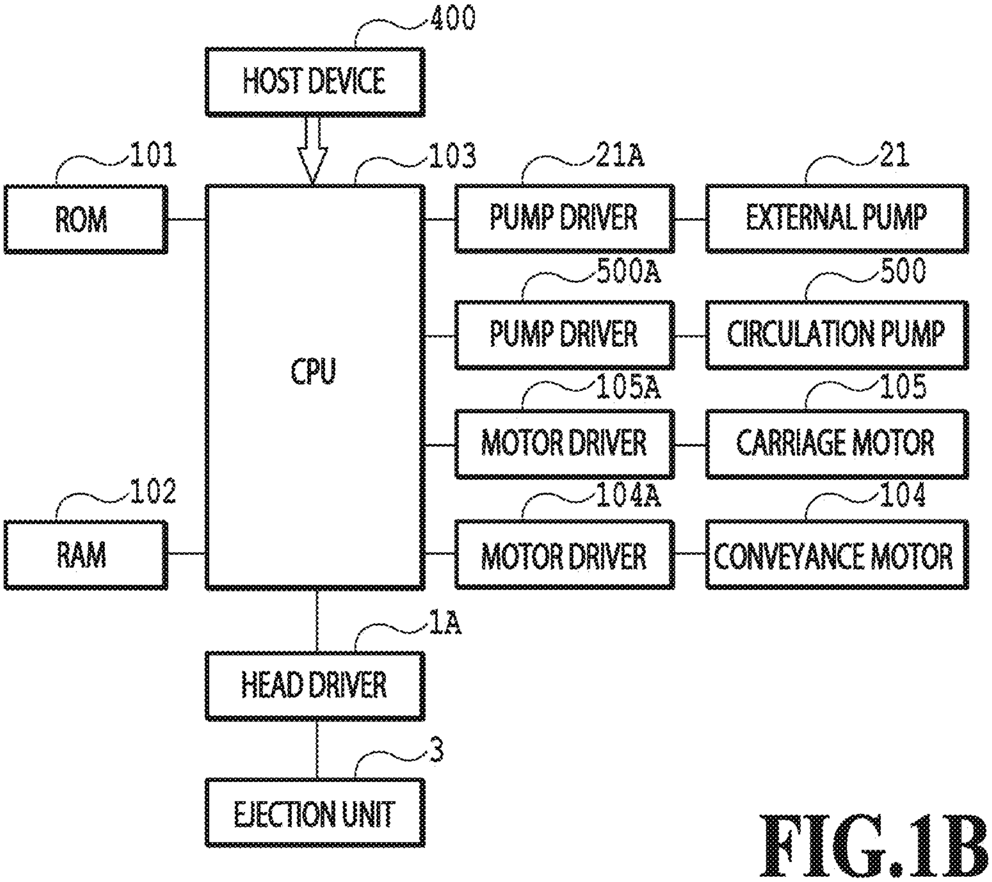
FIG. 1B is a diagram describing the liquid ejection apparatus.

FIGS. 1A and 1B are diagrams describing a liquid ejection apparatus and are enlarged views of a liquid ejection head of the liquid ejection apparatus and the vicinity thereof. First, a schematic configuration of a liquid ejection apparatus 50 in the present embodiment is described with reference to FIGS. 1A and 1B. FIG. 1A is a perspective view schematically illustrating the liquid ejection apparatus in which a liquid ejection head 1 can be mounted. The liquid ejection apparatus 50 of the present embodiment forms a serial type ink jet printing apparatus that performs printing on a printing medium P by ejecting an ink as a liquid while scanning the liquid ejection head 1.

The liquid ejection head 1 is mounted on a carriage 60. The carriage 60 reciprocally moves along a main scanning direction (an X direction) along a guide shaft 51. The printing medium P is conveyed by conveyance rollers 55, 56, 57, and 58 in a sub scanning direction (a Y direction) crossing (in a case of the present example, orthogonal to) the main scanning direction. Note that, in the drawings to be referred to below, a Z direction indicates a vertical direction and is crossing (in a case of the present example, orthogonal to) an X-Y plane defined by the X direction and the Y direction. The liquid ejection head 1 is formed to be detachable from and attachable to the carriage 60 by a user.

The liquid ejection head 1 includes a circulation unit 54 and a later-described ejection unit 3 (see FIG. 2). The ejection unit 3 is provided with multiple ejection ports and an energy generation element (hereinafter, referred to as an ejection element) that generates ejection energy to eject the liquid from each ejection port, and a specific configuration is described later.

Additionally, the liquid ejection apparatus 50 is provided with an ink tank 2 as an ink supply source and an external pump 21, and the ink reserved in the ink tank 2 is supplied to the circulation unit 54 through an ink supply tube 59 by driving force of the external pump 21.

The liquid ejection apparatus 50 forms a predetermined image on the printing medium P by repeating printing scanning to perform printing by ejecting the ink while the liquid ejection head 1 mounted on the carriage 60 is moving in the main scanning direction and a conveyance operation to convey the printing medium P in the sub scanning direction. Note that, the liquid ejection head 1 in the present embodiment can eject four types of inks, which are black (K), cyan (C), magenta (M), and yellow (Y), and can print a full-color image by those inks. However, the ink that can be ejected from the liquid ejection head 1 is not limited to the above-described four types of inks. The present disclosure is also applicable to a liquid ejection head that ejects another type of ink. That is, the type and the number of the ink to be ejected from the liquid ejection head are not limited.

Moreover, the liquid ejection apparatus 50 is provided with a cap member (not illustrated) that can cover an ejection port surface, in which the ejection port of the liquid ejection head is formed, in a position far from a conveyance path of the printing medium P in the X direction. The cap member covers the ejection port surface of the liquid ejection head 1 in a non-printing operation and is used to prevent the dryness of the ejection port, protect the ejection port, and perform an ink suction operation from the ejection port, and the like.

Note that, although the liquid ejection head 1 illustrated in FIG. 1A indicates an example in which the liquid ejection head 1 includes four circulation units 54 corresponding to the four types of inks, it is not limited thereto as long as the circulation unit 54 that corresponds to the type of the liquid to be ejected. Additionally, multiple circulation units 54 may be provided for the same type of liquid. That is, the liquid ejection head 1 can have a configuration including one or more circulation units. A configuration in which not all the four types of inks are circulated but only at least one ink is circulated may also be applicable.

FIG. 1B is a block diagram illustrating a control system of the liquid ejection apparatus 50. A CPU 103 fulfills a function as a control unit that controls an operation of each unit of the liquid ejection apparatus 50 based on a program of a processing order and the like stored in a ROM 101. A RAM 102 is used as a working area or the like in a case where the CPU 103 executes processing. The CPU 103 receives image data from a host device 400 outside the liquid ejection apparatus 50, controls a head driver 1A, and controls driving of the ejection element provided in the ejection unit 3. Additionally, the CPU 103 also controls drivers of various actuators provided in the liquid ejection apparatus 50. For example, the CPU 103 controls a motor driver 105A of a carriage motor 105 to move the carriage 60, a motor driver 104A of a conveyance motor 104 to convey the printing medium P, and the like. In addition, the CPU 103 controls a pump driver 500A that drives a later-described circulation pump 500, a pump driver 21A that drives the external pump 21, and the like. Note that, although FIG. 1B illustrates a mode in which processing is performed based on the image data received from the host device 400, the processing may be performed by the liquid ejection apparatus 50 not depending on the data from the host device 400.

<Basic Configuration of Liquid Ejection Head>

Figure 2:
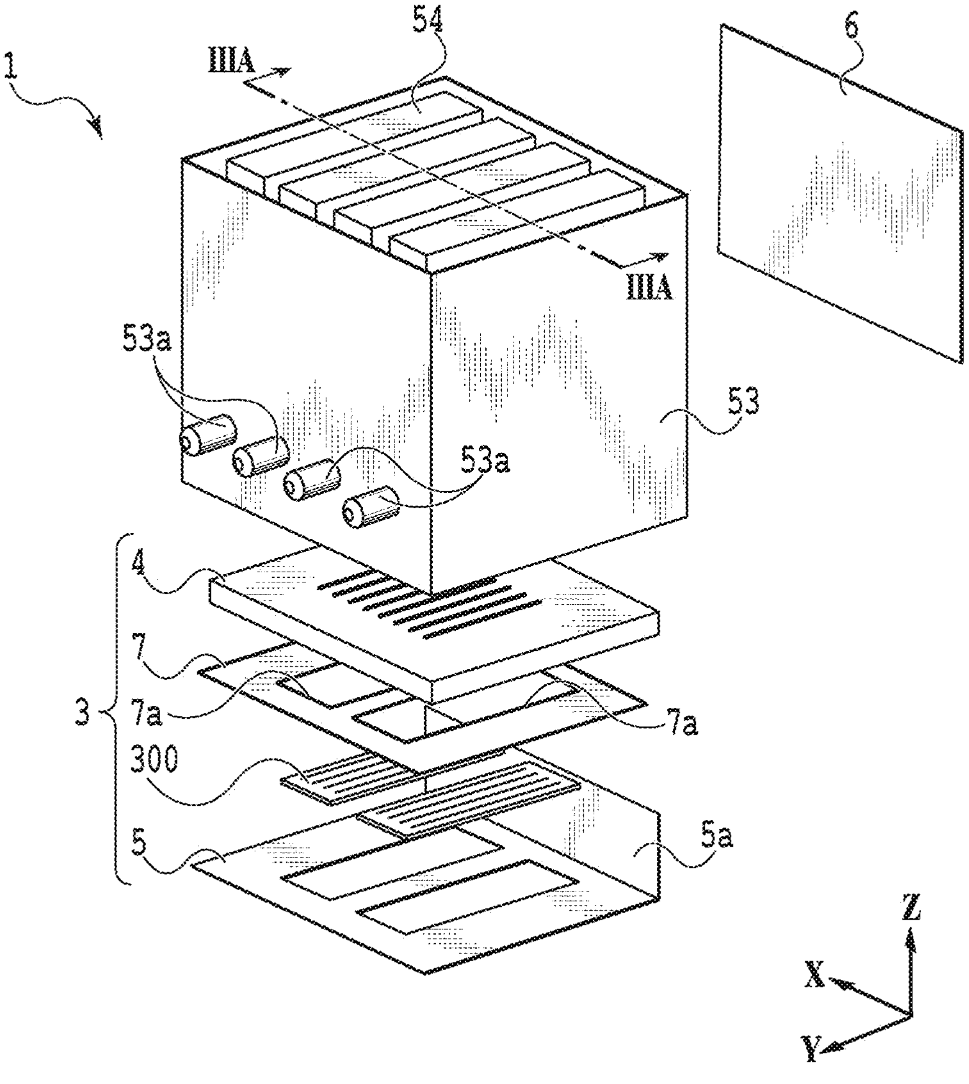
FIG. 2 is an exploded perspective view of a liquid ejection head.
Figure 3A:
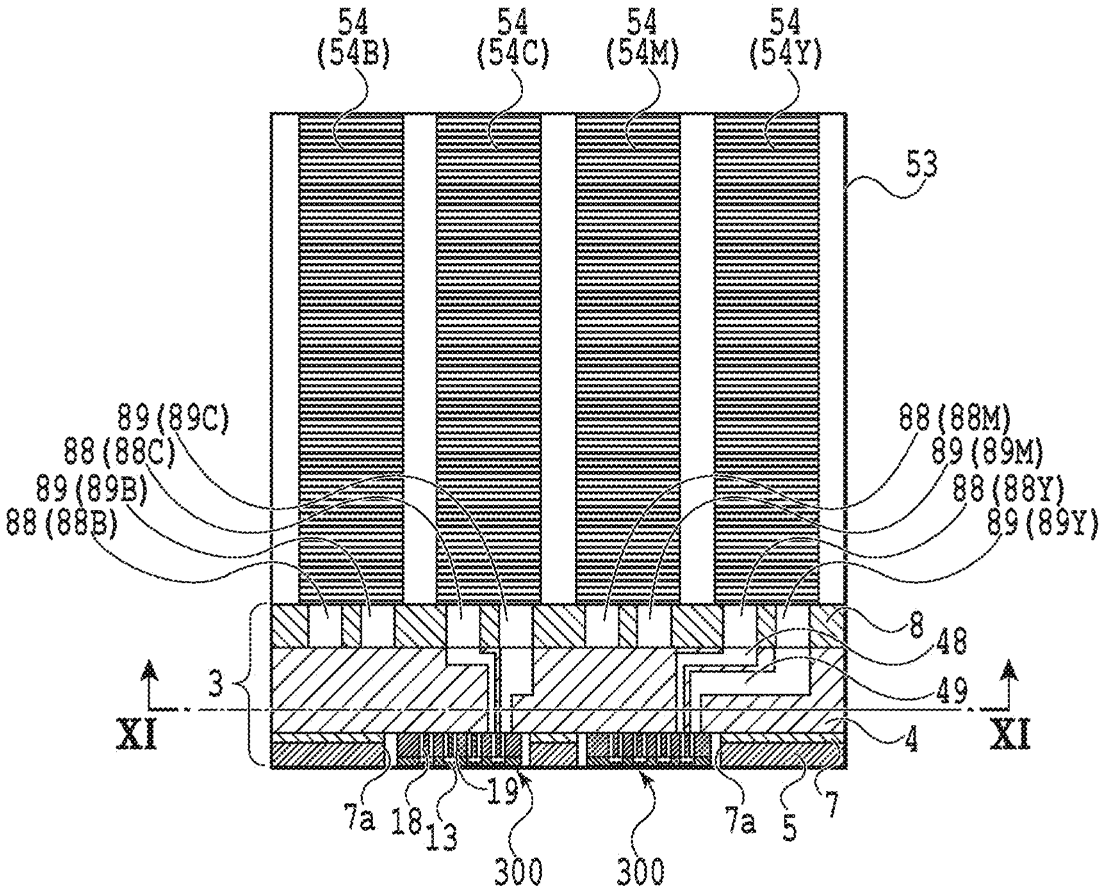
FIG. 3A is a vertical cross-sectional view of the liquid ejection head.
Figure 3B:
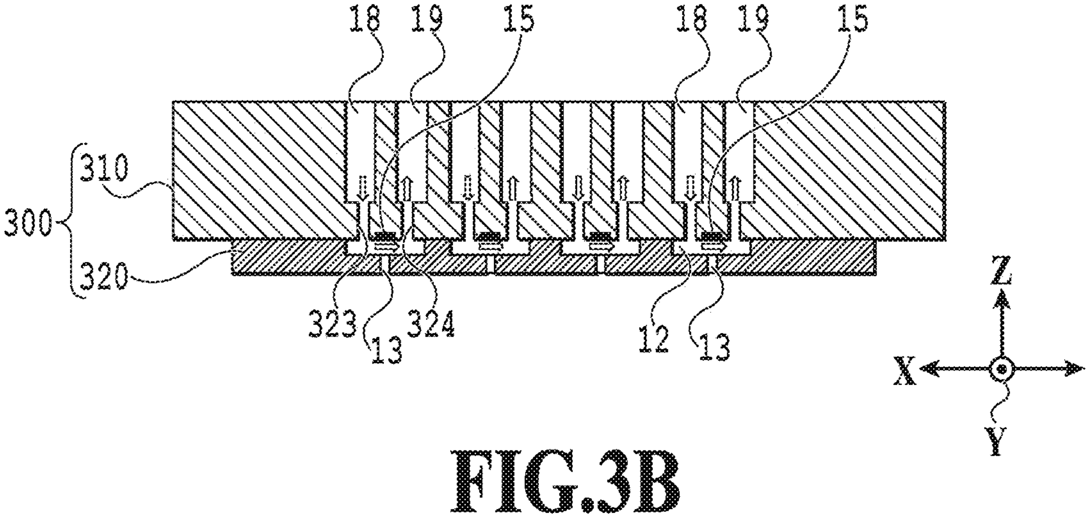
FIG. 3B is an enlarged cross-sectional view of an ejection module.

FIG. 2 is an exploded perspective view of the liquid ejection head 1 of the present embodiment. FIGS. 3A and 3B are cross-sectional views of the liquid ejection head 1 illustrated in FIG. 2 that are taken along a IIIA-IIIA line. FIG. 3A is a vertical cross-sectional view of the entirety of the liquid ejection head 1, and FIG. 3B is an enlarged view of an ejection module illustrated in FIG. 3A. A basic configuration of the liquid ejection head 1 in the present embodiment is described below with reference to FIGS. 2, 3A, and 3B mainly and FIG. 1 as needed.

As illustrated in FIG. 2, the liquid ejection head 1 includes the circulation unit 54 and the ejection unit 3 to eject the ink supplied from the circulation unit 54 onto the printing medium P. The liquid ejection head 1 in the present embodiment is fixed and supported on the carriage 60 by not-illustrated positioning unit and electric contact provided to the carriage 60 of the liquid ejection apparatus 50. The liquid ejection head 1 performs printing on the printing medium P by ejecting the ink while moving in the main scanning direction (the X direction) illustrated in FIG. 1A with the carriage 60.

The external pump 21 connected to the ink tank 2 as the ink supply source is provided with the ink supply tube 59 (see FIG. 1A). A not-illustrated liquid connector is provided at a tip of this ink supply tube 59. In a case where the liquid ejection head 1 is mounted in the liquid ejection apparatus 50, the liquid connector provided at the tip of the ink supply tube 59 is air-tightly connected to a liquid connector insertion port 53*a*, which is an inlet of the liquid that is provided in a head housing 53 of the liquid ejection head 1. Thus, an ink supply path from the ink tank 2 to the liquid ejection head 1 by way of the external pump 21 is formed. In the present embodiment, since the four types of inks are used, four pairs of the ink tank 2, the external pump 21, the ink supply tube 59, and the circulation unit 54 are provided corresponding to the respective inks, and four ink supply paths corresponding to the inks are formed independently. Thus, the liquid ejection apparatus 50 of the present embodiment includes an ink supply system to which the ink from the ink tank 2 provided outside the liquid ejection head 1 is supplied. Note that, the liquid ejection apparatus 50 of the present embodiment does not include an ink collection system that collects the ink in the liquid ejection head 1 into the ink tank 2. Accordingly, the liquid ejection head 1 is provided with the liquid connector insertion port 53*a* to connect the ink supply tube 59 of the ink tank 2 but not provided with a connector insertion port to connect a tube to collect the ink in the liquid ejection head 1 into the ink tank 2. Note that, the liquid connector insertion port 53*a* is provided for each ink.

In FIG. 3A, 54B indicates a circulation unit for the black ink, 54C indicates a circulation unit for the cyan ink, 54M indicates a circulation unit for the magenta ink, and 54Y indicates an ink circulation unit for the yellow ink, respectively. The circulation units have substantially similar configurations, and in a case where the circulation units are not particularly distinguished in the present embodiment, any of the circulation units are written as the circulation unit 54.

In FIGS. 2 and 3A, the ejection unit 3 includes two ejection modules 300, a first support member 4, a second support member 7, an electric wiring member (an electric wiring tape) 5, and an electric contact substrate 6. As illustrated in FIG. 3B, each ejection module 300 includes a silicon substrate 310 of a thickness of 0.5 mm to 1 mm and multiple ejection elements 15 provided on one surface of the silicon substrate 310. Each ejection element 15 in the present embodiment is formed of an electrothermal conversion element (a heater) that generates heat energy as the ejection energy to eject the liquid. Each ejection element 15 is supplied with electric power through an electric wiring formed on the silicon substrate 310 by a film formation technique.

Additionally, an ejection port formation member 320 is formed on a surface (a lower surface in FIG. 3B) of the silicon substrate 310. In the ejection port formation member 320, multiple pressure chambers 12 corresponding to the multiple ejection elements 15 and multiple ejection ports 13 from which the ink is ejected are formed by a photolithography technique. In addition, a common supply channel 18 and a common collection channel 19 are formed in the silicon substrate 310. Additionally, a supply connection channel 323 that allows the common supply channel 18 and each pressure chamber 12 to communicate with each other and a collection connection channel 324 that allows the common collection channel 19 and each pressure chamber 12 to communicate with each other are formed in the silicon substrate 310. In the present embodiment, one ejection module 300 is formed to eject two types of inks. That is, out of the two ejection modules illustrated in FIG. 3A, the ejection module 300 positioned on a left side in FIG. 3A ejects the black ink and the cyan ink, and the ejection module 300 positioned on a right side in FIG. 3A ejects the magenta ink and the yellow ink. Note that, this combination is an example, and any combination of the inks may be applied. A configuration in which one ejection module ejects one type of ink may be applied, and a configuration in which one ejection module ejects three or more types of inks may be applied. The two ejection modules 300 may not eject the same number of types of inks. A configuration including one ejection module 300 may be applied, and a configuration including three or more ejection modules 300 may be applied. In addition, in the example illustrated in FIG. 3, two ejection port rows extending in the Y direction are formed for each color of ink. The pressure chamber 12, the common supply channel 18, and the common collection channel 19 are formed for each of the multiple ejection ports 13 forming each ejection port row.

An ink supply port and an ink collection port described later are formed on a back surface (an upper surface in FIG. 3B) side of the silicon substrate 310. The ink supply port supplies the ink to multiple common supply channels 18 from an ink supply channel 48, and the ink collection port collects the ink from multiple common collection channels 19 into an ink collection channel 49.

Note that, the ink supply port and the ink collection port herein indicate openings through which the ink is supplied and collected during ink circulation in a forward direction (described later). That is, during the ink circulation in the forward direction, the ink is supplied to each common supply channel 18 from the ink supply port, and the ink is collected into the ink collection port from each common collection channel 19. However, in some cases, the ink circulation to flow the ink in a backward direction may be performed. In this case, the ink is supplied to the common collection channel 19 from the above-described ink collection port, and the ink is collected into the ink supply port from the common supply channel 18.

As illustrated in FIG. 3A, a back surface (an upper surface in FIG. 3A) of the ejection module 300 is adhered and fixed to one surface (a lower surface in FIG. 3A) of the first support member 4. In the first support member 4, the ink supply channel 48 and the ink collection channel 49 penetrating the first support member 4 from the one surface to the other surface of the first support member 4 are formed. One opening of the ink supply channel 48 communicates with the above-mentioned ink supply port in the silicon substrate 310, and one opening of the ink collection channel 49 communicates with the above-mentioned ink collection port in the silicon substrate 310, respectively. Note that, the ink supply channel 48 and the ink collection channel 49 are independently provided for each ink type.

Additionally, the second support member 7 including an opening 7*a* (see FIG. 2) through which the ejection module 300 is inserted is adhered and fixed to the one surface of the first support member 4 (the lower surface in FIG. 3A). The electric wiring member 5 electrically connected to the ejection module 300 is held on the second support member 7. The electric wiring member 5 is a member to apply an electric signal to eject the ink to the ejection module 300. An electric connection portion between the ejection module 300 and the electric wiring member 5 is sealed by a sealing member (not illustrated) and is protected from corrosion due to the ink and an exogenous impact.

Moreover, the electric contact substrate 6 is bonded to an end portion 5*a* (see FIG. 2) of the electric wiring member 5 with thermocompression by using a not-illustrated anisotropic conductive film, and the electric wiring member 5 and the electric contact substrate 6 are electrically connected to each other. The electric contact substrate 6 includes an external signal input terminal (not illustrated) to receive an electric signal from the liquid ejection apparatus 50.

In addition, a joint member 8 (see FIG. 3A) is provided between the first support member 4 and the circulation unit 54. A supply port 88 and a collection port 89 are formed in the joint member 8 for each ink type. The supply port 88 and the collection port 89 allow for communication between the ink supply channel 48 and the ink collection channel 49 of the first support member 4 and a channel formed in the circulation unit 54. Note that, in FIG. 3A, a supply port 88B and a collection port 89B correspond to the black ink, and a supply port 88C and a collection port 89C correspond to the cyan ink. Additionally, a supply port 88M and a collection port 89M correspond to the magenta ink, and a supply port 88Y and a collection port 89Y correspond to the yellow ink.

Note that, an opening in one end portion of each of the ink supply channel 48 and the ink collection channel 49 of the first support member 4 has a small opening area for the ink supply port and the ink collection port in the silicon substrate 310. In contrast, an opening in the other end portion of each of the ink supply channel 48 and the ink collection channel 49 of the first support member 4 has a shape enlarged to have the same opening area as a great opening area of the joint member 8 that is formed for the channel in the circulation unit 54. With such a configuration being employed, it possible to suppress rising of a channel resistance to the ink collected from each collection channel. However, the shapes of the openings in the one end portion and the other end portion of each of the ink supply channel 48 and the ink collection channel 49 are not limited to the above-described example.

In the liquid ejection head 1 having the above-described configuration, the ink supplied to the circulation unit 54 passes through the supply port 88 of the joint member 8 and the ink supply channel 48 of the first support member 4 and flows into the common supply channel 18 from the ink supply port of the ejection module 300. Subsequently, the ink flows from the common supply channel 18 into the pressure chamber 12 through the supply connection channel 323, and a part of the ink that flows in the pressure chamber 12 is ejected from the ejection port 13 with the ejection element 15 being driven. The remaining ink that is not ejected flows from the pressure chamber 12, passes through the collection connection channel 324 and the common collection channel 19, and flows into the ink collection channel 49 of the first support member 4 from the ink collection port. Then, the ink that flows in the ink collection channel 49 flows into the circulation unit 54 by way of the collection port 89 of the joint member 8 and is collected.

<Constituent of Circulation Unit>

Figure 4:
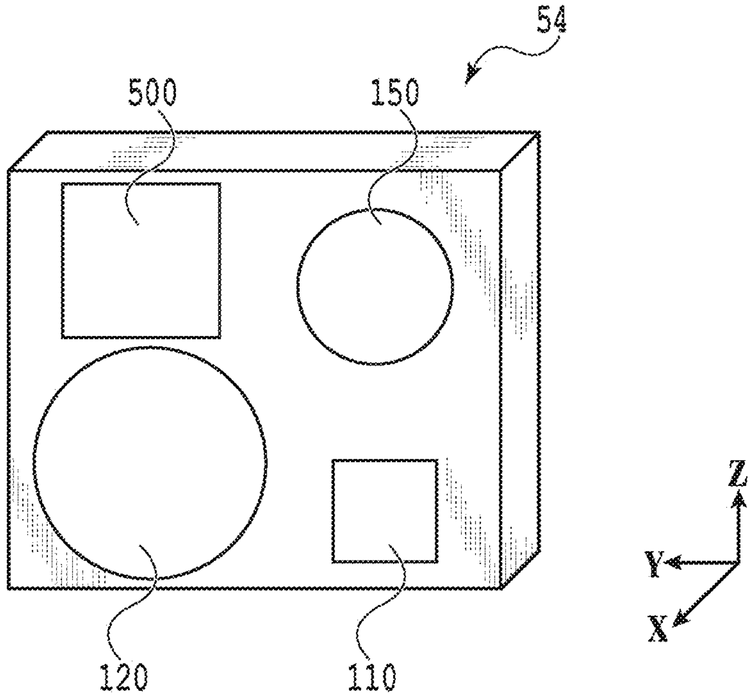
FIG. 4 is an exterior schematic view of a circulation unit.

FIG. 4 is an exterior schematic view of one circulation unit 54 corresponding to one type of ink that is applied to the printing apparatus of the present embodiment. A filter 110, a first pressure adjustment unit 120, a second pressure adjustment unit 150, and the circulation pump 500 are arranged in the circulation unit 54. These constituents are connected to each other by channels as illustrated in FIGS. 5 and 6 and form a circulation path through which the ink is supplied and collected to and from the ejection module 300 in the liquid ejection head 1.

<Circulation Path in Liquid Ejection Head>

Figure 5:
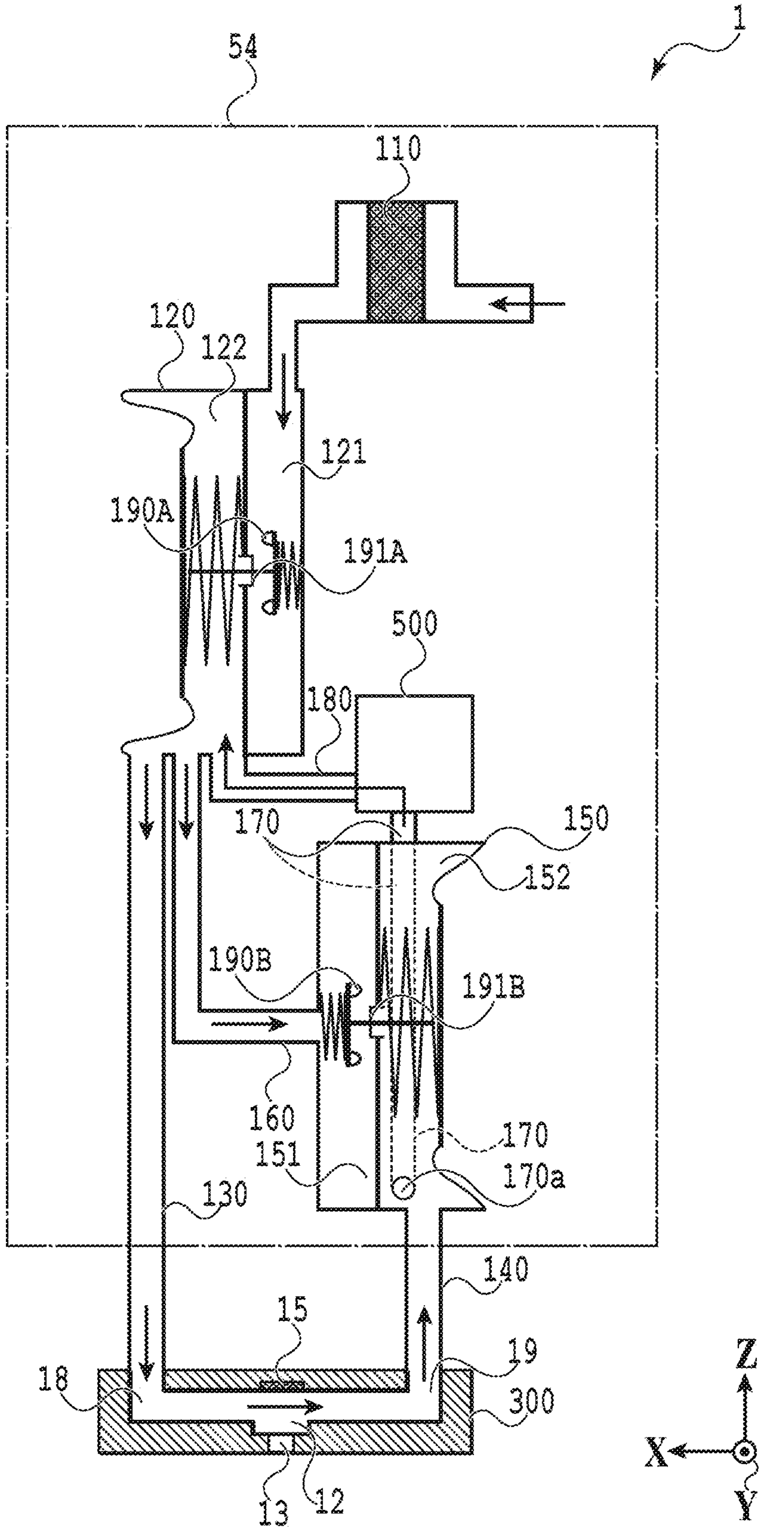
FIG. 5 is a vertical cross-sectional view illustrating a circulation path.
Figure 6:
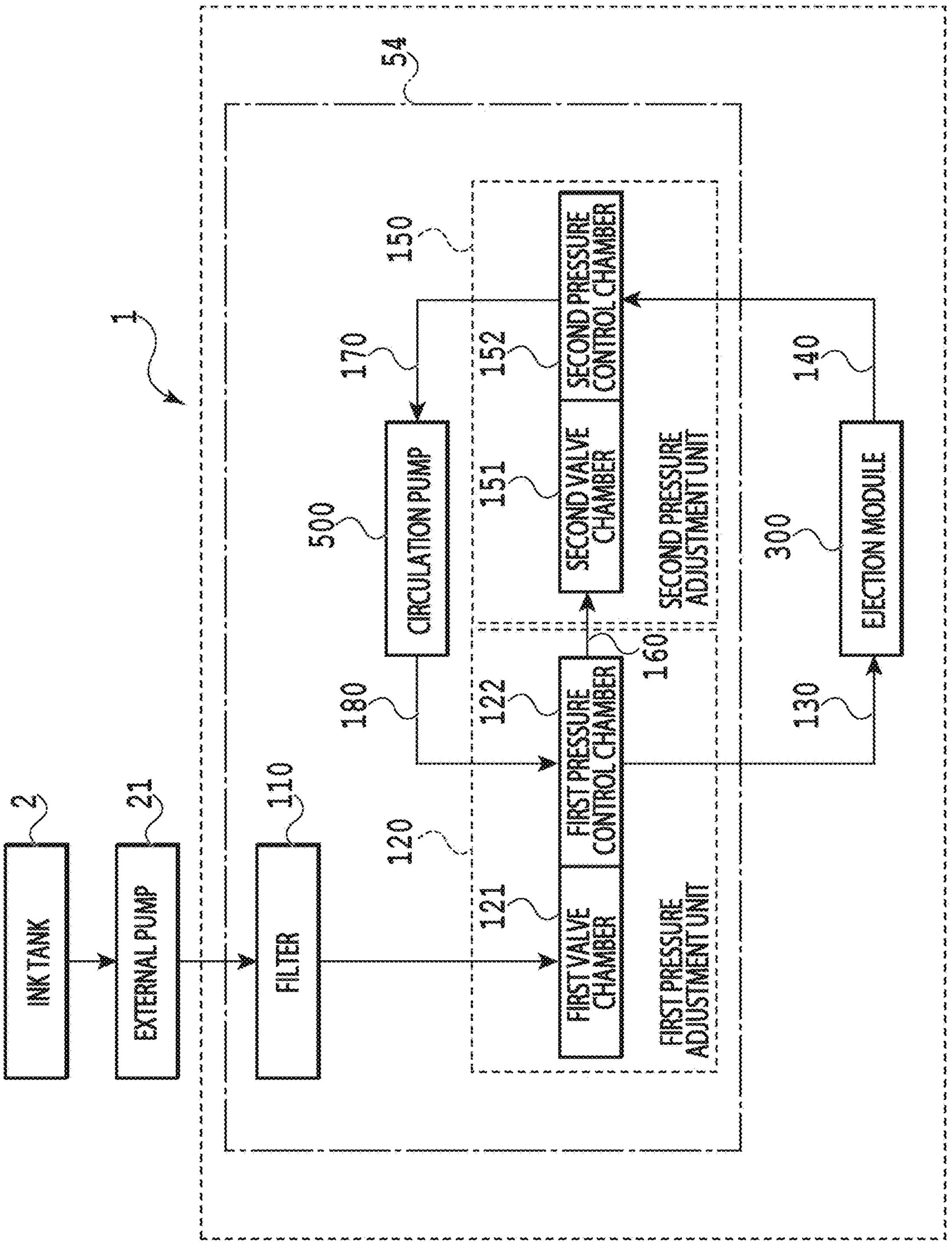
FIG. 6 is a block diagram schematically illustrating the circulation path.

FIG. 5 is a vertical cross-sectional view schematically illustrating the circulation path of one type of ink (one color of ink) that is formed in the liquid ejection head 1. In order to describe the circulation path more explicitly, relative positions of the configurations in FIG. 5 (the first pressure adjustment unit 120, the second pressure adjustment unit 150, the circulation pump 500, and so on) are simplified. For this reason, the relative positions of the configurations are different from a configuration in FIG. 19 described later. Additionally, FIG. 6 is a block diagram schematically illustrating the circulation path illustrated in FIG. 5. As illustrated in FIGS. 5 and 6, the first pressure adjustment unit 120 includes a first valve chamber 121 and a first pressure control chamber 122. The second pressure adjustment unit 150 includes a second valve chamber 151 and a second pressure control chamber 152. The first pressure adjustment unit 120 is formed to have a control pressure proportionally higher than that of the second pressure adjustment unit 150. In the present embodiment, with use of these two pressure adjustment units 120 and 150, the circulation within a constant pressure range is implemented in the circulation path. Additionally, the configuration allows the ink to flow through the pressure chamber 12 (the ejection element 15) at a flow rate according to a pressure difference between the first pressure adjustment unit 120 and the second pressure adjustment unit 150. The circulation path in the liquid ejection head 1 and the flow of the ink in the circulation path are described below with reference to FIGS. 5 and 6. Note that, an arrow in each of FIGS. 5 and 6 indicates a direction of the flow of the ink.

First, a connection state of the constituents in the liquid ejection head 1 is described.

The external pump 21 that delivers the ink stored in the ink tank 2 (FIG. 6) provided outside the liquid ejection head 1 to the liquid ejection head 1 is connected with the circulation unit 54 through the ink supply tube 59 (FIG. 1A). The filter 110 is provided in an ink channel positioned upstream of the circulation unit 54. An ink supply path positioned downstream of the filter 110 is connected to the first valve chamber 121 of the first pressure adjustment unit 120. The first valve chamber 121 communicates with the first pressure control chamber 122 through a communication port 191A that can be opened and closed by a valve 190A illustrated in FIG. 5.

The first pressure control chamber 122 is connected to a supply channel 130, a bypass channel 160, and a pump outlet channel 180 of the circulation pump 500. The supply channel 130 is connected to the common supply channel 18 through the above-mentioned ink supply port provided in the ejection module 300. Additionally, the bypass channel 160 is connected to the second valve chamber 151 provided in the second pressure adjustment unit 150. The second valve chamber 151 communicates with the second pressure control chamber 152 through a communication port 191B that is opened and closed by a valve 190B illustrated in FIG. 5. Note that, FIGS. 5 and 6 illustrate an example in which one end of the bypass channel 160 is connected to the first pressure control chamber 122 of the first pressure adjustment unit 120, and the other end of the bypass channel 160 is connected to the second valve chamber 151 of the second pressure adjustment unit 150. However, the one end of the bypass channel 160 may be connected to the supply channel 130, and the other end of the bypass channel may be connected to the second valve chamber 151.

The second pressure control chamber 152 is connected to a collection channel 140. The collection channel 140 is connected to the common collection channel 19 through the above-mentioned ink collection port provided in the ejection module 300. In addition, the second pressure control chamber 152 is connected to the circulation pump 500 through a pump inlet channel 170. Note that, in FIG. 5, 170*a* indicates an inlet port of the pump inlet channel 170.

Next, the flow of the ink in the liquid ejection head 1 having the above-described configuration is described. As illustrated in FIG. 6, the ink stored in the ink tank 2 is pressurized by the external pump 21 provided in the liquid ejection apparatus 50 and supplied to the circulation unit 54 of the liquid ejection head 1 as an ink flow at a positive pressure.

A foreign substance such as dust and air bubbles in the ink supplied to the circulation unit 54 are removed with the ink passing through the filter 110, and thereafter the ink flows into the first valve chamber 121 provided in the first pressure adjustment unit 120. The pressure of the ink is reduced by a pressure loss while the ink is passing through the filter 110; however, the pressure of the ink at this stage is in a positive pressure state. Thereafter, in a case where the valve 190A is in an open state, the ink that flows in the first valve chamber 121 passes through the communication port 191A and flows into the first pressure control chamber 122. Because of the pressure loss while the ink is passing through the communication port 191A, the pressure of the ink that flows in the first pressure control chamber 122 is switched to a negative pressure from the positive pressure.

Next, the flow of the ink in the circulation path is described. The circulation pump 500 operates so as to deliver the ink sucked from the pump inlet channel 170 on the upstream side to the pump outlet channel 180 on the downstream side. Accordingly, with the pump being driven, the ink supplied to the first pressure control chamber 122 flows into the supply channel 130 and the bypass channel 160 with the ink that is delivered from the pump outlet channel 180. Note that, in the present embodiment, as the circulation pump that can deliver a liquid, a piezoelectric diaphragm pump that is driven by a piezoelectric element attached to a diaphragm as a driving source is used, and this is described later in detail. The piezoelectric diaphragm pump is a pump that changes a volume in a pump chamber by inputting a driving voltage to the piezoelectric element and delivers the liquid with two check valves operating alternately by a pressure variation.

The ink that flows in the supply channel 130 flows into the pressure chamber 12 from the ink supply port of the ejection module 300 through the common supply channel 18, and a part of the ink is ejected from the ejection port 13 with the ejection element 15 being driven (heated). Additionally, the remaining ink that is not used for the ejection flows through the pressure chamber 12, passes through the common collection channel 19, and thereafter flows into the collection channel 140 connected to the ejection module 300. The ink that flows in the collection channel 140 flows into the second pressure control chamber 152 of the second pressure adjustment unit 150. Thus, the ink that is delivered from the circulation pump 500 flows in the order of the first pressure control chamber 122 and the ejection module 300 and thereafter returns to the circulation pump 500, and the liquid is circulated.

On the other hand, the ink that flows in the bypass channel 160 from the first pressure control chamber 122 flows into the second valve chamber 151. Thereafter, the ink passes through the communication port 191B and flows into the second pressure control chamber 152. The ink that flows in the second pressure control chamber 152 by way of the bypass channel 160 and the ink collected from the collection channel 140 are sucked into the circulation pump 500 by way of the pump inlet channel 170 with the circulation pump 500 being driven. Then, the ink sucked in the circulation pump 500 is delivered to the pump outlet channel 180 and flows into the first pressure control chamber 122 again. Thereafter, the ink that flows in the second pressure control chamber 152 from the first pressure control chamber 122 by way of the supply channel 130 and the ejection module 300 and the ink that flows in the second pressure control chamber 152 through the bypass channel 160 flow into the circulation pump 500. Then, the ink is delivered from the circulation pump 500 to the first pressure control chamber 122. Thus, the ink circulation in the circulation path is performed.

Here, a channel that allows the first pressure adjustment unit 120 and the pressure chamber 12 to communicate with each other is referred to as a first channel, and a channel that allows the pressure chamber 12 and the circulation pump 500 to communicate with each other is referred to as a second channel. That is, the supply channel 130 is referred to as the first channel, and the collection channel 140, the second pressure adjustment unit 150, and the pump inlet channel 170 are collectively referred to as the second channel. Note that, the second channel may not include the second pressure adjustment unit 150 and the pump inlet channel 170. Additionally, the pump outlet channel 180 is also referred to as a third channel. Accordingly, in the present embodiment, the liquid flows through the circulation path including the circulation pump 500, the third channel, the first pressure adjustment unit 120, the first channel, the pressure chamber 12, the second channel, and the circulation pump 500 in sequence.

As above, in the present embodiment, the circulation pump 500 makes it possible to circulate the liquid along the circulation path formed in the liquid ejection head 1. Therefore, it is possible to suppress the thickening of the ink and the deposition of precipitated components of the ink of the color material in the ejection module 300, and it is possible to maintain the flowability of the ink in the ejection module 300 and the ejection characteristics in the ejection port to a favorable state.

Additionally, since the circulation path in the present embodiment employs the configuration that is within the liquid ejection head 1, compared to a case where the ink circulation is performed between the ink tank 2 provided outside the liquid ejection head 1 and the liquid ejection head 1, it is possible to considerably shorten the circulation path length. Therefore, it is possible to circulate the ink with a small circulation pump.

In addition, the connection channel between the liquid ejection head 1 and the ink tank 2 has a configuration including only the channel to supply the ink. That is, a configuration that needs no channel to collect the ink from the liquid ejection head 1 to the ink tank 2 is employed. Therefore, only the tube for ink supply needs to be provided for the connection the ink tank 2 between the liquid ejection head 1, and there is no need to provide the tube for ink collection. Accordingly, it is possible to implement a simple configuration in which the number of the tubes inside the liquid ejection apparatus 50 is reduced, and it is possible to implement size reduction of the whole apparatus. In addition, since the number of the tubes is reduced, it is possible to reduce a pressure variation in the ink caused by an oscillation of the tube along with the main scanning of the liquid ejection head 1. Additionally, the oscillation of the tube during the main scanning of the liquid ejection head 1 is a driving load on the carriage motor driving the carriage 60. Therefore, with the reduced number of the tubes, the driving load on the carriage motor is reduced, and it is possible to simplify a main scanning mechanism including the carriage motor and the like. In addition, since it is unnecessary to collect the ink from the liquid ejection head into the ink tank, it is also possible to reduce the size of the external pump 21. Thus, according to the present embodiment, it is possible to implement the size reduction and cost reduction of the liquid ejection apparatus 50.

<Pressure Adjustment Unit>

Figure 7C:
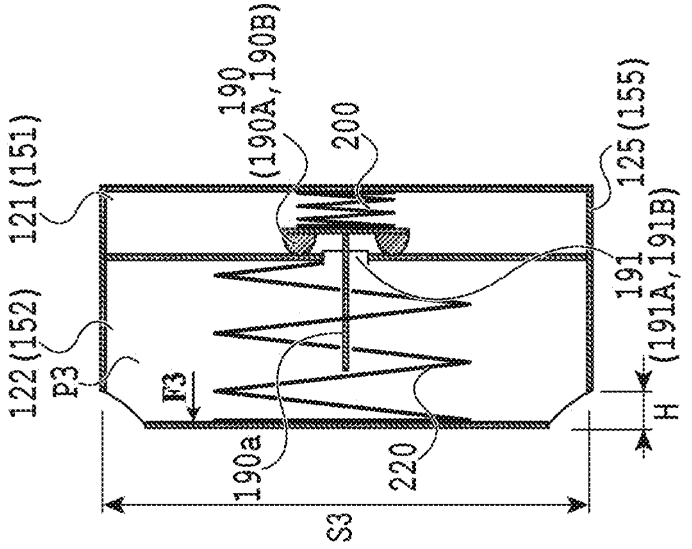
FIG. 7C is a cross-sectional view illustrating an example of the pressure adjustment unit.
Figure 7B:
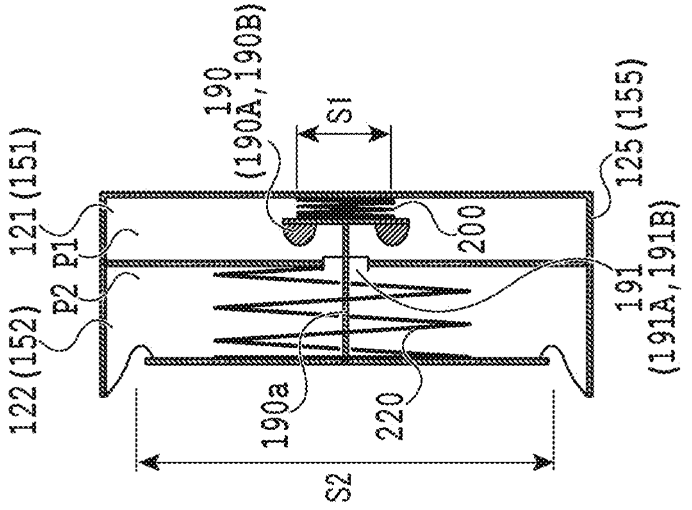
FIG. 7B is a cross-sectional view illustrating an example of the pressure adjustment unit.
Figure 7A:
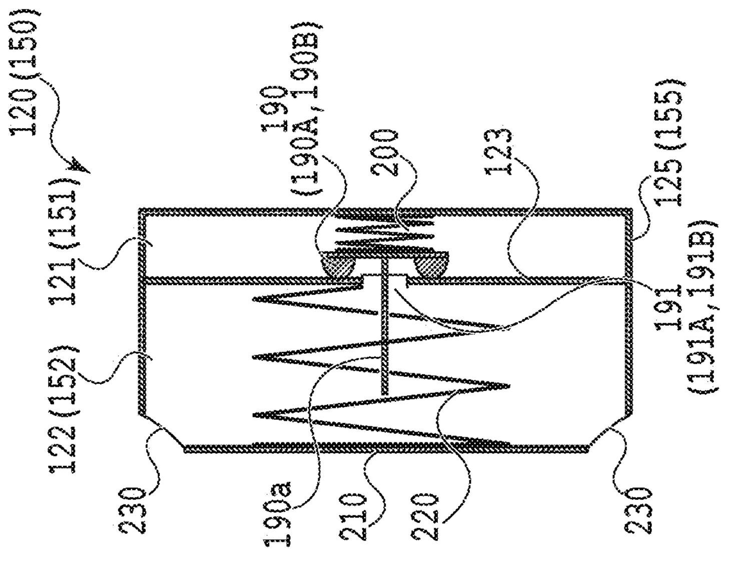
FIG. 7A is a cross-sectional view illustrating an example of a pressure adjustment unit.

FIGS. 7A to 7C are diagrams illustrating an example of the pressure adjustment unit. The configuration and operation of the pressure adjustment unit (the first pressure adjustment unit 120 and the second pressure adjustment unit 150) mounted in the above-described liquid ejection head 1 are described in more detail with reference to FIGS. 7A to 7C. Note that, the first pressure adjustment unit 120 and the second pressure adjustment unit 150 have substantially the same configurations. Therefore, hereinafter, the first pressure adjustment unit 120 is described as an example, and the second pressure adjustment unit 150 is described only by also indicating a reference numeral of a portion corresponding to the first pressure adjustment unit in FIGS. 7A to 7C. In a case of the second pressure adjustment unit 150, the first valve chamber 121 is replaced with the second valve chamber 151, and the first pressure control chamber 122 is replaced with the second pressure control chamber 152, which are described later.

The first pressure adjustment unit 120 includes the first valve chamber 121 and the first pressure control chamber 122 formed in a cylindrical housing 125. The first valve chamber 121 and the first pressure control chamber 122 are partitioned by a partition 123 provided in the cylindrical housing 125. Note that, the first valve chamber 121 communicates with the first pressure control chamber 122 through the communication port 191 formed in the partition 123. In the first valve chamber 121, the valve 190 that switches the communication and the blocking in the communication port 191 between the first valve chamber 121 and the first pressure control chamber 122 is provided. The valve 190 is held in a position facing the communication port 191 by a valve spring 200 and has a configuration to be able to be in close contact with the partition 123 by bias force of the valve spring 200. With the close contact between the valve 190 and the partition 123, the flow of the ink through the communication port 191 is blocked. Note that, in order to improve the closeness with the partition 123, it is preferred to form a contact portion between the valve 190 and the partition 123 with an elastic member. Additionally, a valve shaft 190*a* inserted into the communication port 191 is provided to extend in a central portion of the valve 190. With this valve shaft 190*a* being pressed against the bias force of the valve spring 200, the valve 190 is moved away from the partition 123, and the ink can flow through the communication port 191. Hereinafter, a state in which the flow of the ink through the communication port 191 is blocked by the valve 190 is referred to as a “closed state”, and a state in which the ink can flow through the communication port 191 is referred to as the “open state”.

An opening portion of the cylindrical housing 125 is closed by a flexible member 230 and a pressure plate 210. The first pressure control chamber 122 is formed of this flexible member 230, the pressure plate 210, a peripheral wall of the housing 125, and the partition 123. The volume of the first pressure control chamber 122 is variable, and the pressure plate 210 is formed so as to be displaceable along with the displacement of the flexible member 230. Materials of the pressure plate 210 and the flexible member 230 are not particularly limited; however, for example, it is possible to form the pressure plate 210 with a resin molding member and to form the flexible member 230 with a resin film. In this case, it is possible to fix the pressure plate 210 to the flexible member 230 by thermal welding.

A pressure adjustment spring 220 (a bias member) is provided between the pressure plate 210 and the partition 123. With bias force of the pressure adjustment spring 220, the pressure plate 210 and the flexible member 230 are biased in a direction in which the inner volume of the first pressure control chamber 122 is increased as illustrated in FIG. 7A. Additionally, in a case where a pressure in the first pressure control chamber 122 is decreased, the pressure plate 210 and the flexible member 230 are displaced against the pressure adjustment spring 220 in a direction in which the inner volume of the first pressure control chamber 122 is decreased. Then, in a case where the inner volume of the first pressure control chamber 122 is decreased to a certain amount, the pressure plate 210 is put in contact with the valve shaft 190*a* of the valve 190. Thereafter, in a case where the inner volume of the first pressure control chamber 122 is further decreased, the valve 190 is moved with the valve shaft 190*a* against the bias force of the valve spring 200 and moved away from the partition 123. Thus, the communication port 191 is switched to the open state (a state in FIG. 7B).

In the present embodiment, connection setting in the circulation path is made such that the pressure in the first valve chamber 121 is higher than the pressure in the first pressure control chamber 122 in a case where the communication port 191 is switched to the open state. Thus, in a case where the communication port 191 is switched to the open state, the ink flows from the first valve chamber 121 into the first pressure control chamber 122. With this ink flow, the flexible member 230 and the pressure plate 210 are displaced in the direction in which the inner volume of the first pressure control chamber 122 is increased. As a result, the pressure plate 210 is moved away from the valve shaft 190*a* of the valve 190, the valve 190 is put in close contact with the partition 123 by the bias force of the valve spring 200, and the communication port 191 is switched to the closed state (a state in FIG. 7C).

Thus, in the first pressure adjustment unit 120 in the present embodiment, in a case where the pressure in the first pressure control chamber 122 is decreased to a certain pressure or below (for example, in a case where the negative pressure is increased), the ink flows from the first valve chamber 121 through the communication port 191. Thus, the first pressure adjustment unit 120 is formed so as to prevent a further decrease of the pressure in the first pressure control chamber 122. Accordingly, the first pressure control chamber 122 is controlled to keep the pressure within a certain range.

Next, the pressure in the first pressure control chamber 122 is described in more detail.

Here is considered a state (the state in FIG. 7B) in which the flexible member 230 and the pressure plate 210 are displaced according to the pressure in the first pressure control chamber 122 as mentioned above, the pressure plate 210 is put in contact with the valve shaft 190*a*, and the communication port 191 is switched to the open state. In this case, a relationship of force acting on the pressure plate 210 is expressed by Expression 1 below.

$$P2 \times S2 + F2 + (P1 - P2) \times S1 + F1 = 0 \quad \text{Expression 1}$$

In addition, in a case where Expression 1 is rearranged for P2, the following expression is obtained.

$$P2 = -(F1 + F2 + P1 \times S1)/(S2 - S1) \quad \text{Expression 2}$$

- P1: the pressure in the first valve chamber 121 (a gauge pressure)
- P2: the pressure in the first pressure control chamber 122 (a gauge pressure)
- F1: the spring force of the valve spring 200
- F2: the spring force of the pressure adjustment spring 220
- S1: a pressure reception area of the valve 190
- S2: a pressure reception area of the pressure plate 210

In this case, a direction of the spring force F1 of the valve spring 200 and the spring force F2 of the pressure adjustment spring 220 to press the valve 190 and the pressure plate 210 is positive (a left direction in FIGS. 7A to 7C). Additionally, regarding the pressure P1 in the first valve chamber 121 and the pressure P2 in the first pressure control chamber 122, a configuration in which P1 has a relationship of P1≥P2 is applied.

The pressure P2 in the first pressure control chamber 122 in a case where the communication port 191 is switched to the open state is determined based on Expression 2, and once the communication port 191 is switched to the open state, the ink flows from the first valve chamber 121 into the first pressure control chamber 122 because of the configuration of the relationship of P1≥P2. As a result, the pressure P2 in the first pressure control chamber 122 is not further decreased, and P2 is kept at the pressure within a certain range.

On the other hand, as illustrated in FIG. 7C, a relationship of force acting on the pressure plate 210 in a case where the pressure plate 210 is in a non-contact state with the valve shaft 190*a*, and the communication port 191 is switched to the closed state is expressed by Expression 3.

$$P3 \times S3 + F3 = 0 \quad \text{Expression 3}$$

Here, in a case where Expression 3 is rearranged for P3, the following expression is obtained.

$$P3 = -F3/S3 \quad \text{Expression 4}$$

- F3: the spring force of the pressure adjustment spring 220 in a case where the pressure plate 210 and the valve shaft 190*a* are in the non-contact state
- P3: the pressure in the first pressure control chamber 122 (the gauge pressure) in a case where the pressure plate 210 and the valve shaft 190*a* are in the non-contact state
- S3: the pressure reception area of the pressure plate 210 in a case where the pressure plate 210 and the valve 190 are in the non-contact state In this case, FIG. 7C illustrates a state in which the pressure plate 210 and the flexible member 230 are displaced in a right direction in FIG. 7C to a displaceable limit. According to the displacement amount while the pressure plate 210 and the flexible member 230 are displaced to the state in FIG. 7C, the pressure P3 in the first pressure control chamber 122, the spring force F3 of the pressure adjustment spring 220, and the pressure reception area S3 of the pressure plate 210 are changed. Specifically, in a case where the pressure plate 210 and the flexible member 230 are on a left side in FIG. 7 of that in FIG. 7C, the pressure reception area S3 of the pressure plate 210 is small, and the spring force F3 of the pressure adjustment spring 220 is great. As a result, based on the relationship expressed by Expression 4, the pressure P3 in the first pressure control chamber 122 is small. Accordingly, based on Expression 2 and Expression 4, while the state transitions from the state in FIG. 7B to the state in FIG. 7C, the pressure in the first pressure control chamber 122 gradually rises (in other words, the negative pressure is decreased to a value close to a positive pressure side). That is, from the state in which the communication port 191 is in the open state, the pressure plate 210 and the flexible member 230 are gradually displaced in the right direction, and until the inner volume of the first pressure control chamber 122 eventually reaches the displaceable limit, the pressure in the first pressure control chamber 122 gradually rises. In other words, the negative pressure is decreased. In the present embodiment, the first pressure adjustment unit 120 adjusts the pressure of the liquid in the first channel, and the second pressure adjustment unit 150 adjusts the pressure of the liquid in the pump inlet channel 170 (in the inlet channel).

<Circulation Pump>

Next, the configuration and operation of the circulation pump 500 mounted in the above-described liquid ejection head 1 are described in detail with reference to FIGS. 8 and 9.

Figure 8B:
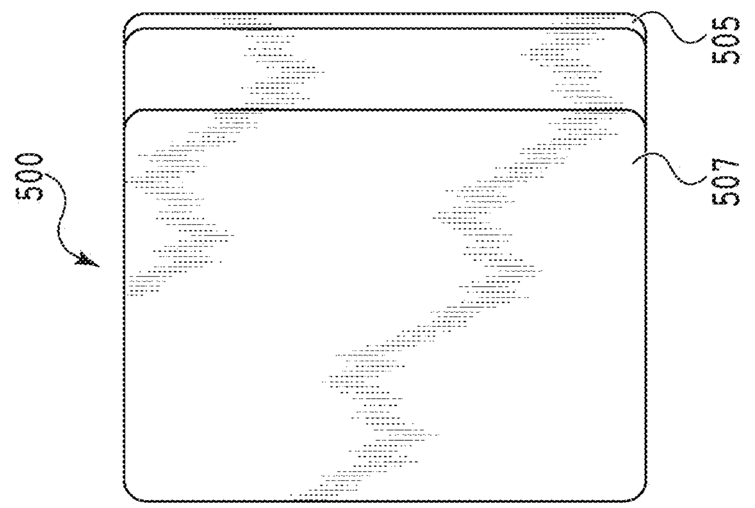
FIG. 8B is an exterior perspective view of the circulation pump.
Figure 8A:
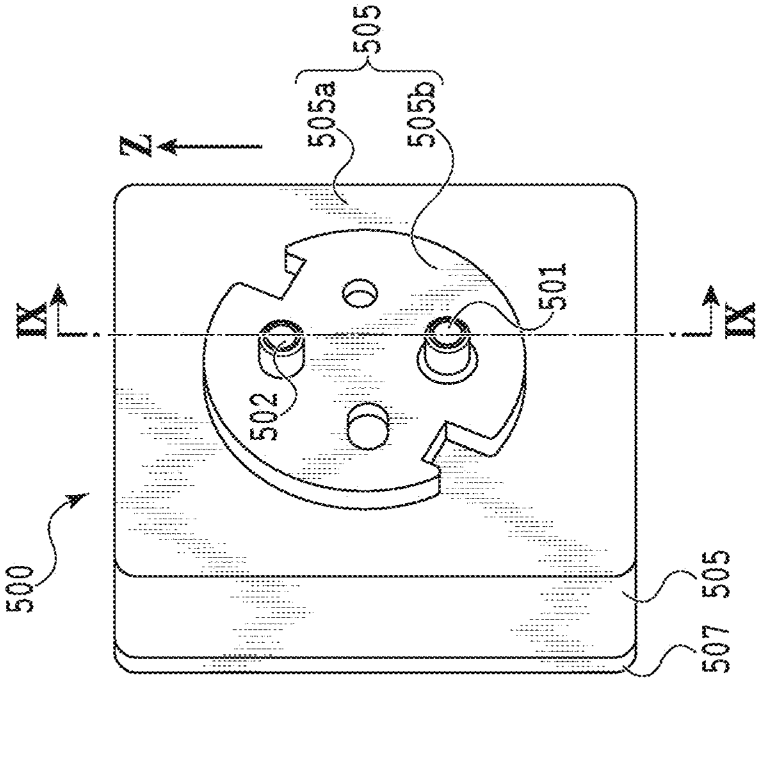
FIG. 8A is an exterior perspective view of a circulation pump.

FIGS. 8A and 8B are exterior perspective views of the circulation pump 500. FIG. 8A is an exterior perspective view illustrating a front surface side of the circulation pump 500, and FIG. 8B is an exterior perspective view illustrating a back surface side of the circulation pump 500. An outer shell of the circulation pump 500 includes a pump housing 505 and a cover 507 fixed to the pump housing 505. The pump housing 505 includes a housing portion main body 505*a* and a channel connection member 505*b* adhered and fixed to an outer surface of the housing portion main body 505*a*. A pair of through-holes communicating with each other are provided in each of two different positions in each of the housing portion main body 505*a* and the channel connection member 505*b*. The pair of through-holes provided in the one position forms a pump supply hole 501, and the pair of through-holes provided in the other position forms a pump discharge hole 502. The pump supply hole 501 is connected to the pump inlet channel 170 connected to the second pressure control chamber 152, and the pump discharge hole 502 is connected to the pump outlet channel 180 connected to the first pressure control chamber 122. The ink supplied from the pump supply hole 501 passes through a pump chamber 503 (see FIG. 9) (described later) and is discharged from the pump discharge hole 502.

Figure 9:
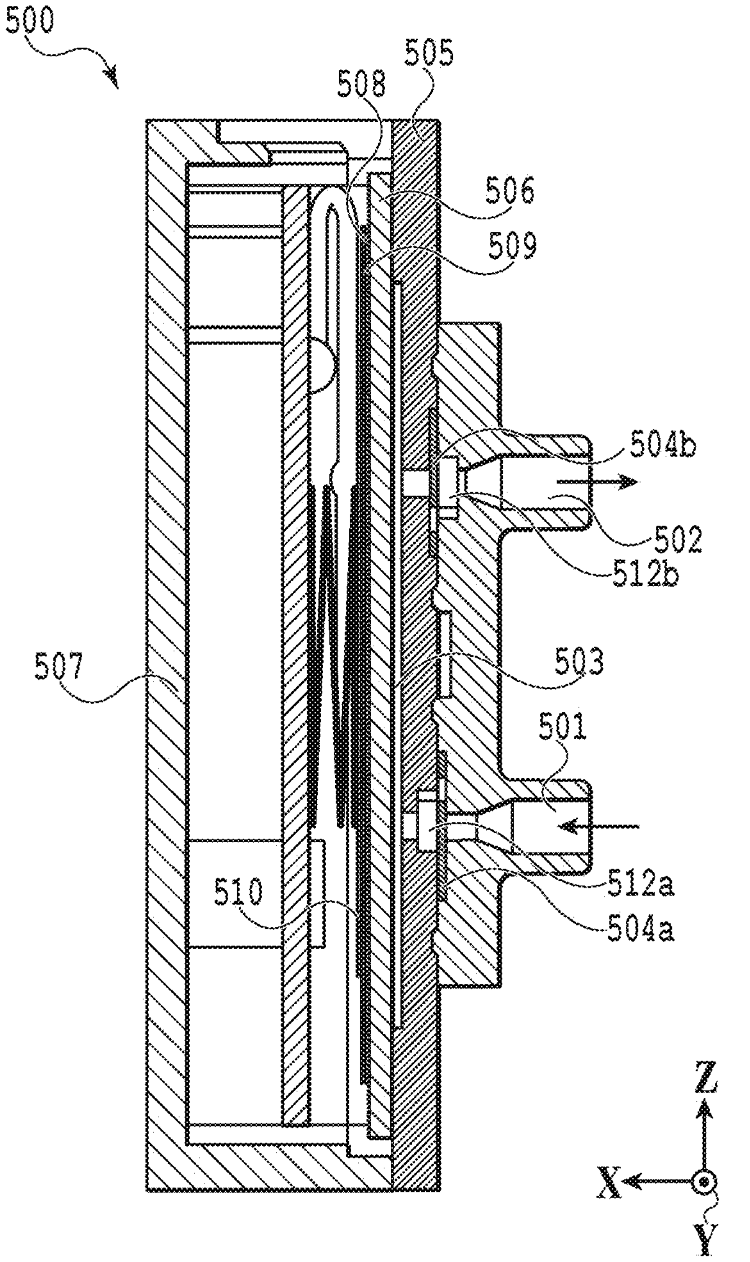
FIG. 9 is a cross-sectional view of the circulation pump illustrated in FIG. 8A that is taken along a IX-IX line.

FIG. 9 is a cross-sectional view of the circulation pump 500 illustrated in FIG. 8A that is taken along a IX-IX line. A diaphragm 506 is joined to an inner surface of the pump housing 505, and the pump chamber 503 is formed between this diaphragm 506 and a recess portion formed on the inner surface of the pump housing 505. The pump chamber 503 communicates with the pump supply hole 501 and the pump discharge hole 502 formed in the pump housing 505. Additionally, a check valve 504*a* is provided in a middle portion of the pump supply hole 501, and a check valve 504*b* is provided in a middle portion of the pump discharge hole 502. That is, the circulation pump 500 includes the check valve in the channel that allows the second channel and the third channel to communicate with each other. Specifically, the check valve 504*a* is arranged such that a part thereof can be moved leftward in FIG. 9 in a space 512*a* formed in the middle portion of the pump supply hole 501. Additionally, the check valve 504*b* is arranged such that a part thereof can be moved rightward in FIG. 9 in a space 512*b* formed in the middle portion of the pump discharge hole 502.

In a case where the pump chamber 503 is depressurized with the diaphragm 506 being displaced, and the volume of the pump chamber 503 being increased, the check valve 504*a* is moved away from the opening of the pump supply hole 501 in the space 512*a* (in other words, the check valve 504*a* is moved leftward in FIG. 9). With the check valve 504*a* being moved away from the opening of the pump supply hole 501 in the space 512*a*, it is switched to the open state that allows the ink to flow through the pump supply hole 501. Additionally, in a case where the pump chamber 503 is pressurized with the diaphragm 506 being displaced, and the volume of the pump chamber 503 being decreased, the check valve 504*a* is put in close contact with a wall surface around the opening of the pump supply hole 501. As a result, it is switched to the closed state in which the ink flow in the pump supply hole 501 is blocked.

On the other hand, in a case where the pump chamber 503 is depressurized, the check valve 504*b* is put in close contact with a wall surface around an opening of the pump housing 505, and it is switched to the closed state in which the ink flow in the pump discharge hole 502 is blocked. Additionally, in a case where the pump chamber 503 is pressurized, the check valve 504*b* is moved away from the opening of the pump housing 505 to a space 512*b* side (in other words, moved rightward in FIG. 9), and the ink can flow through the pump discharge hole 502.

Note that, a material of the check valves 504*a* and 504*b* may be anything as long as it is deformable according to the pressure in the pump chamber 503, and it is possible to form the check valves 504*a* and 504*b* with, for example, an elastic member such as EPDM and elastomer and a film or a thin plate of polypropylene and the like. However, it is not limited thereto.

As mentioned above, the pump chamber 503 is formed by joining the pump housing 505 and the diaphragm 506 with each other. Accordingly, the pressure in the pump chamber 503 is changed with the diaphragm 506 being deformed. For example, in a case where the diaphragm 506 is displaced to a pump housing 505 side (displaced to a right side in FIG. 9), and the volume of the pump chamber 503 is decreased, the pressure in the pump chamber 503 rises. Thus, the check valve 504*b* arranged to face the pump discharge hole 502 is switched to the open state, and the ink in the pump chamber 503 is discharged. At this time, the check valve 504*a* arranged to face the pump supply hole 501 is put in close contact with the wall surface around the pump supply hole 501, and therefore a backflow of the ink from the pump chamber 503 to the pump supply hole 501 is suppressed.

Additionally, on the other hand, in a case where the diaphragm 506 is displaced in a direction in which the pump chamber 503 is expanded, the pressure in the pump chamber 503 is decreased. Thus, the check valve 504*a* arranged to face the pump supply hole 501 is switched to the open state, and the pump chamber 503 is supplied with the ink. At this time, the check valve 504*b* arranged in the pump discharge hole 502 is put in close contact with the wall surface around the opening formed in the pump housing 505 and closes the opening. Therefore, a backflow of the ink from the pump discharge hole 502 to the pump chamber 503 is suppressed.

Thus, in the circulation pump 500, the ink is sucked and discharged with the diaphragm 506 being deformed to change the pressure in the pump chamber 503. In this case, if bubbles are mixed in the pump chamber 503, even though the diaphragm 506 is displaced, the pressure change in the pump chamber 503 is reduced due to the expansion and contraction of the bubbles, and the liquid delivery amount is reduced. To deal with this, the pump chamber 503 is arranged parallel to gravity to facilitate the gathering of the bubbles mixed in the pump chamber 503 in an upper portion of the pump chamber 503, and the pump discharge hole 502 is arranged higher than the center of the pump chamber 503. Thus, it is possible to improve the discharging properties of the bubbles in the pump and to stabilize the flow rate.

<Flow of Ink in Liquid Ejection Head>

Figure 10B:
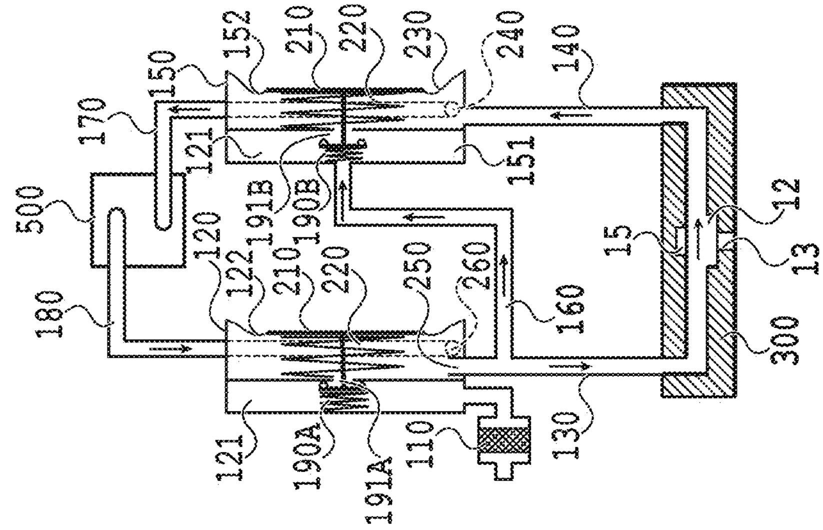
FIG. 10B is a diagram describing the flow of the ink in the liquid ejection head.
Figure 10A:
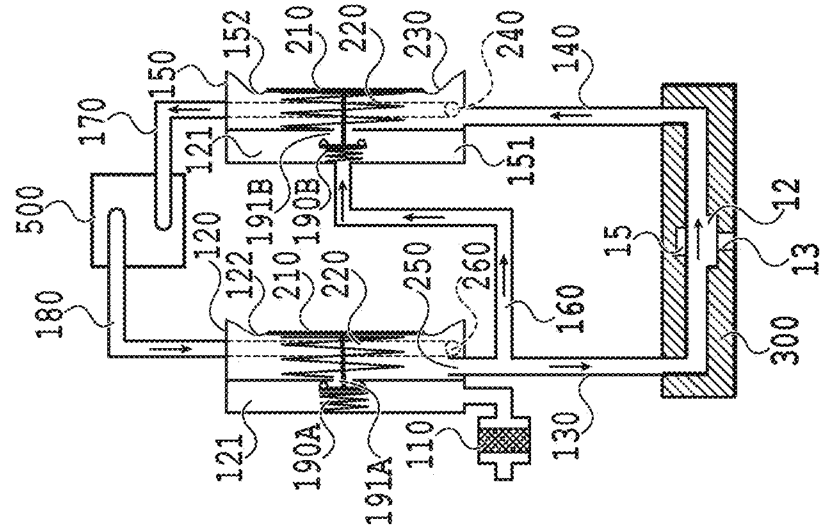
FIG. 10A is a diagram describing a flow of an ink in the liquid ejection head.

FIGS. 10A to 10E are diagrams describing the flow of the ink in the liquid ejection head. The circulation of the ink performed in the liquid ejection head 1 is described with reference to FIGS. 10A to 10E. In order to describe the ink circulation path more explicitly, relative positions of the configurations in FIG. 10 (the first pressure adjustment unit 120, the second pressure adjustment unit 150, the circulation pump 500, and so on) are simplified. Therefore, the relative positions of the configurations are different from a configuration in FIG. 19 (described later). FIG. 10A schematically illustrates the flow of the ink in a case of performing the printing operation in which the ink is ejected from the ejection port 13 to perform printing. Note that an arrow in FIG. 10A indicates the flow of the ink. In the present embodiment, in a case where the printing operation is performed, both the external pump 21 and circulation pump

500 start driving. Note that, the external pump 21 and the circulation pump 500 may be driven regardless of the printing operation. Additionally, the external pump 21 and the circulation pump 500 may not be driven in conjunction with each other and may be driven individually and independently.

During the printing operation, a state of the circulation pump 500 is ON (a driving state), and the ink flows from the circulation pump 500, passes through the pump outlet channel 180, and flows into the first pressure control chamber 122 from a supply port 260. The ink that flows out of the first pressure control chamber 122 flows into the supply channel 130 and the bypass channel 160. The ink that flows into the supply channel 130 passes through the ejection module 300, then flows into the collection channel 140, and thereafter is supplied to the second pressure control chamber 152. Details of the supply port 260 are described later.

On the other hand, the ink that flows into the bypass channel 160 from the first pressure control chamber 122 passes through the second valve chamber 151 and flows into the second pressure control chamber 152. The ink that flows into the second pressure control chamber 152 flows out of a collection port 240, passes through the pump inlet channel 170, the circulation pump 500, and the pump outlet channel 180, and then flows into the first pressure control chamber 122 again. At this time, a control pressure of the first valve chamber 121 is set higher than a control pressure of the first pressure control chamber 122 based on the above-described relationship expressed by Expression 2. Accordingly, the ink in the first pressure control chamber 122 is supplied to the ejection module 300 through the supply channel 130 again without flowing to the first valve chamber 121. The ink that flows in the ejection module 300 passes through the collection channel 140, the second pressure control chamber 152, the pump inlet channel 170, the circulation pump 500, and the pump outlet channel 180 and flows into the first pressure control chamber 122 again. As above, the ink circulation is performed within the liquid ejection head 1.

In the above ink circulation, the circulation amount (the flow rate) of the ink in the ejection module 300 is determined based on a differential pressure between the control pressures of the first pressure control chamber 122 and the second pressure control chamber 152. Then, this differential pressure is set so as to achieve a circulation amount that can suppress the thickening of the ink in the vicinity of the ejection port in the ejection module 300. Additionally, the ink of an amount consumed by the printing is supplied from the ink tank 2 to the first pressure control chamber 122 through the filter 110 and the first valve chamber 121. The structure to supply the consumed amount of ink is described in detail. As the ink is decreased in the circulation path by an amount of the ink consumed by the printing, the pressure in the first pressure control chamber is decreased, and as a result, the ink in the first pressure control chamber 122 is also decreased. Along with the decrease of the ink in the first pressure control chamber 122, the inner volume of the first pressure control chamber 122 is decreased. With this decrease of the inner volume of the first pressure control chamber 122, the communication port 191A is switched to the open state, and the ink is supplied to the first pressure control chamber 122 from the first valve chamber 121. In this supplied ink, a pressure loss occurs while the ink passes through the communication port 191A from the first valve chamber 121, and the ink having the positive pressure is switched to the negative pressure state with the ink flowing into the first pressure control chamber 122. Then, with the ink flowing into the first pressure control chamber 122 from the first valve chamber 121, the pressure in the first pressure control chamber 122 rises, the inner volume of the first pressure control chamber 122 is increased, and the communication port 191A is switched to the closed state. Thus, the communication port 191A repeats switching between the open state and the closed state according to the consumption of the ink. Additionally, in a case where no ink is consumed, the communication port 191A is maintained in the closed state.

FIG. 10B schematically illustrates the flow of the ink immediately after the printing operation ends, and the circulation pump 500 is switched to an OFF state (a stop state). At the time when the printing operation ends, and the circulation pump 500 is switched to OFF, the pressure in the first pressure control chamber 122 and the pressure in the second pressure control chamber 152 are both the control pressures for the printing operation. Therefore, the ink is moved as illustrated in FIG. 10B according to the differential pressure between the pressure in the first pressure control chamber 122 and the pressure in the second pressure control chamber 152. Specifically, the flow of the ink that allows the ink to be supplied from the first pressure control chamber 122 to the ejection module 300 through the supply channel 130 and thereafter reach the second pressure control chamber 152 through the collection channel 140 continues. Additionally, the flow of the ink that allows the ink to reach the second pressure control chamber 152 from the first pressure control chamber 122 through the bypass channel 160 and the second valve chamber 151 also continues.

The amount of the ink moved from the first pressure control chamber 122 to the second pressure control chamber 152 by the flow of the ink is supplied from the ink tank 2 to the first pressure control chamber 122 through the filter 110 and the first valve chamber 121. Therefore, the amount of the contents in the first pressure control chamber 122 is maintained constant. Based on the relationship expressed by Expression 2, in a case where the amount of the contents in the first pressure control chamber 122 is constant, the spring force F1 of the valve spring 200, the spring force F2 of the pressure adjustment spring 220, the pressure reception area S1 of the valve 190, and the pressure reception area S2 of the pressure plate 210 are maintained constant. Therefore, the pressure in the first pressure control chamber 122 is determined according to the change of the pressure (the gauge pressure) P1 of the first valve chamber 121. Therefore, in a case where there is no change of the pressure P1 in the first valve chamber 121, the pressure P2 in the first pressure control chamber 122 is maintained at the same pressure as the control pressure during the printing operation.

Figure 10C:
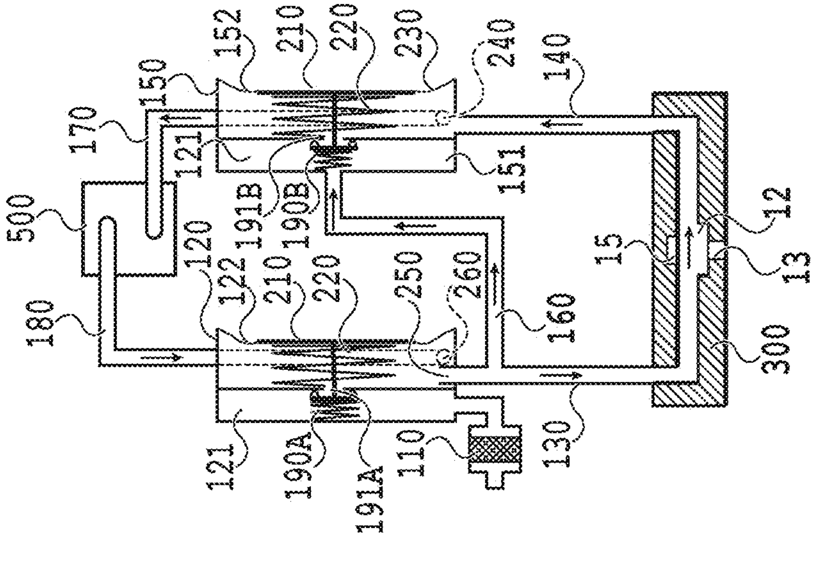
FIG. 10C is a diagram describing the flow of the ink in the liquid ejection head.
Figure 10D:
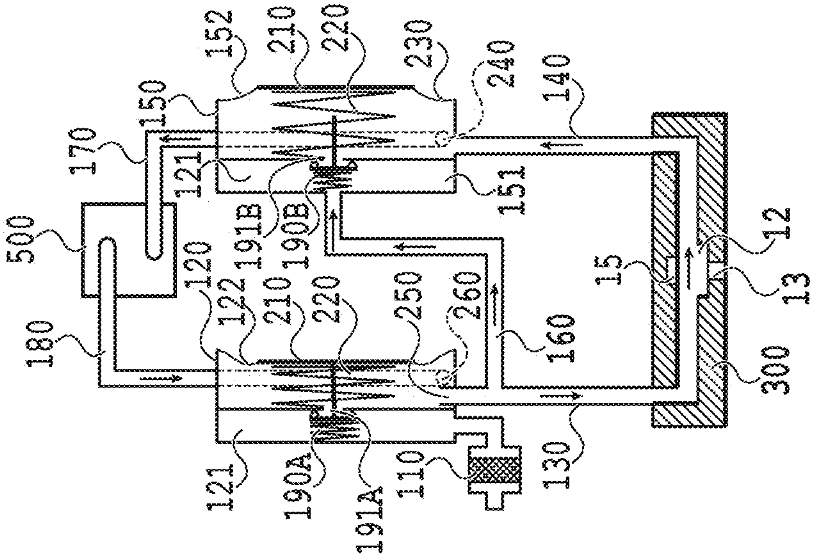
FIG. 10D is a diagram describing the flow of the ink in the liquid ejection head.

On the other hand, the pressure in the second pressure control chamber 152 is changed over time according to the change of the amount of the contents along with the inflow of the ink from the first pressure control chamber 122. Specifically, from the state in FIG. 10B until the state as illustrated in FIG. 10C in which the communication port 191 is switched to the closed state, and the second valve chamber 151 and the second pressure control chamber 152 are in the non-communication state, the pressure in the second pressure control chamber 152 is changed according to Expression 2. Thereafter, the pressure plate 210 and the valve shaft 190*a* are in the non-contact state, and the communication port 191 is switched to the closed state. Then, as illustrated in FIG. 10D, the ink flows into the second pressure control chamber 152 from the collection channel 140. Until the pressure plate 210 and the flexible member 230 are displaced, and the inner volume of the second pressure control chamber 152 reaches the maximum because of this inflow of the ink, the pressure in the second pressure control chamber 152 is changed according to Expression 4. That is, the pressure rises.

Note that, in the state in FIG. 10C, there is no flow of the ink from the first pressure control chamber 122 to the second pressure control chamber 152 through the bypass channel 160 and the second valve chamber 151. Accordingly, there is only a flow that reaches the second pressure control chamber 152 through the collection channel 140 after the ink in the first pressure control chamber 122 is supplied to the ejection module 300 through the supply channel 130. As mentioned above, the movement of the ink from the first pressure control chamber 122 to the second pressure control chamber 152 occurs according to the differential pressure between the pressure in the first pressure control chamber 122 and the pressure in the second pressure control chamber 152. Therefore, once the pressure in the second pressure control chamber 152 becomes equal to the pressure in the first pressure control chamber 122, the movement of the ink is stopped.

Figure 10E:
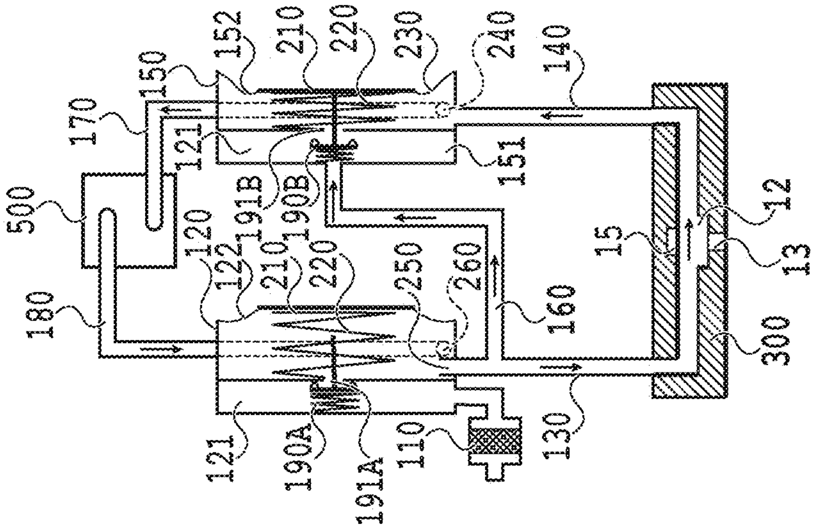
FIG. 10E is a diagram describing the flow of the ink in the liquid ejection head.

Additionally, in a state in which the pressure in the second pressure control chamber 152 is equal to the pressure in the first pressure control chamber 122, the second pressure control chamber 152 is expanded to the state illustrated in FIG. 10D. In a case where the second pressure control chamber 152 is expanded as illustrated in FIG. 10D, a reservoir unit that can reserve the ink is formed in the second pressure control chamber 152. Note that, the time from when the circulation pump 500 is stopped until the state transitions to the state in FIG. 10D may be changed depending on the shape and size of the channel and the properties of the ink; however, the transition generally takes about one to two minutes. In a case where the circulation pump 500 is driven in the state illustrated in FIG. 10D in which the ink is reserved in the reservoir unit, the ink in the reservoir unit is supplied to the first pressure control chamber 122 by the circulation pump 500. Thus, as illustrated in FIG. 10E, the ink amount in the first pressure control chamber 122 is increased, and the flexible member 230 and the pressure plate 210 are displaced in the expansion direction. Then, in a case where the circulation pump 500 continues driving, the state in the circulation path is changed as illustrated in FIG. 10A.

Note that, although FIG. 10A is described as an example during the printing operation in the above descriptions, the ink circulation may be performed without the printing operation as mentioned above. Even in this case, the flow of the ink as illustrated in FIGS. 10A to 10E also occurs according to the driving and stopping of the circulation pump 500.

Additionally, as described above, the present embodiment uses an example in which the communication port 191B in the second pressure adjustment unit 150 is switched to the open state in a case where the circulation pump 500 is driven, and the ink circulation is performed, and the communication port 191B is switched to the closed state once the ink circulation is stopped; however, it is not limited thereto. The communication port 191B in the second pressure adjustment unit 150 may set the control pressure to be the closed state even in a case where the circulation pump 500 is driven, and the ink circulation is performed. A specific description is given below together with a role of the bypass channel 160.

The bypass channel 160 connecting the first pressure adjustment unit 120 and the second pressure adjustment unit 150 is provided to avoid an effect on the ejection module 300 in a case where the negative pressure generated in the circulation path is higher than a predetermined value, for example. Additionally, the bypass channel 160 is provided also to supply the ink to the pressure chamber 12 from two sides, the supply channel 130 and the collection channel 140.

First, an example in which the effect on the ejection module 300 in a case where the negative pressure is higher than the predetermined value is avoided by providing the bypass channel 160 is described. For example, the characteristics (for example, a viscosity) of the ink may be changed due to a change of an environment temperature. In a case where the viscosity of the ink is changed, the pressure loss in the circulation path is also changed. For example, in a case where the viscosity of the ink is decreased, the pressure loss in the circulation path is decreased. As a result, the flow rate of the circulation pump 500 driven at a constant driving amount is increased, and the flow rate of a flow in the ejection module 300 is increased. On the other hand, since the ejection module 300 is maintained at a constant temperature by a not-illustrated temperature adjustment mechanism, the viscosity of the ink in the ejection module 300 is maintained constant even in a case where the environment temperature is changed. Since the flow rate of the ink flowing in the ejection module 300 is increased while there is no change in the viscosity of the ink in the ejection module 300, the negative pressure in the ejection module 300 is increased because of the flow resistance. In a case where the negative pressure in the ejection module 300 is higher than the predetermined value as above, there is a possibility that a meniscus in the ejection port 13 is broken, the external air is drawn into the circulation path, and normal ejection cannot be performed. Additionally, even in a case where the meniscus is not broken, there is a possibility that the negative pressure in the pressure chamber 12 is higher than a predetermined value, and the ejection is affected.

For this reason, in the present embodiment, the bypass channel 160 is formed in the circulation path. With the bypass channel 160 being provided, the ink also flows to the bypass channel 160 in a case where the negative pressure is higher than the predetermined value; therefore, it is possible to maintain the pressure in the ejection module 300. Accordingly, for example, a configuration in which the control pressure maintains the closed state of the communication port 191B in the second pressure adjustment unit 150 even in a case where the circulation pump 500 is being driven may be applied. Then, the control pressure in the second pressure adjustment unit 150 may be set such that the communication port 191 in the second pressure adjustment unit 150 is in the open state in a case where the negative pressure is higher than the predetermined value. In other words, as long as the meniscus is not broken by the change of the flow rate in the pump due to the viscosity change such as the environment change, or as long as the predetermined negative pressure is maintained, the communication port 191B may be in the closed state in a case where the circulation pump 500 is being driven.

Next, an example in which the bypass channel 160 is provided to supply the ink to the pressure chamber 12 from the two sides, the supply channel 130 and the collection channel 140, is described. The pressure variation in the circulation path may occur due to the ejection operation by the ejection element 15. This is because force that draws the ink into the pressure chamber is generated along with the ejection operation.

A case where the ink supplied to the pressure chamber 12 is supplied from the two sides, a supply channel 130 side and a collection channel 140 side, in a case where high duty printing is continued is described below. Note that, although a definition of the duty may be changed depending on various conditions, in this case, a state in which an ink droplet of 4 pl is printed on a grid of 1200 dpi is treated as 100%. The high duty printing means that printing is performed at a duty of 100%, for example.

In a case where the high duty printing is continued, the amount of the ink that flows into the second pressure control chamber 152 from the pressure chamber 12 through the collection channel 140 is decreased. On the other hand, since the circulation pump 500 flows out the ink at a constant amount, a balance between the outflow and the inflow in the second pressure control chamber 152 is lost, the ink in the second pressure control chamber 152 is decreased, the negative pressure in the second pressure control chamber 152 is increased, and the second pressure control chamber 152 is contracted. Then, with the negative pressure in the second pressure control chamber 152 being increased, an inflow amount of the ink that flows into the second pressure control chamber 152 through the bypass channel 160 is increased, and the second pressure control chamber 152 is stabilized in a state in which the outflow and inflow are balanced. Thus, eventually, the negative pressure in the second pressure control chamber 152 is increased according to the duty. Additionally, as described above, in a configuration in which the communication port 191B is in the closed state in a case where the circulation pump 500 is driven, the communication port 191B is switched to the open state according to the duty, and the ink flows into the second pressure control chamber 152 from the bypass channel 160.

Then, in a case where the high duty printing is further continued, the amount that flows from the pressure chamber 12 into the second pressure control chamber 152 through the collection channel 140 is decreased, and instead, the amount that flows from the communication port 191B into the second pressure control chamber 152 by way of the bypass channel 160 is increased. In a case where this state further advances, the amount of the ink that flows from the pressure chamber 12 into the second pressure control chamber 152 through the collection channel 140 becomes zero, and all the ink that flows out to the circulation pump 500 is the ink that flows from the communication port 191B. In a case where this state further advances, this time, the ink backflows from the second pressure control chamber 152 to the pressure chamber 12 through the collection channel 140. In this state, the ink that flows out to the circulation pump 500 and the ink that flows out to the pressure chamber 12 from the second pressure control chamber 152 flow into the second pressure control chamber 152 from the communication port 191B through the bypass channel 160. In this case, the pressure chamber 12 is filled with the ink from the supply channel 130 and the ink from the collection channel 140, and the ink is ejected.

Note that, this backflow of the ink that occurs in a case where the printing duty is high is a phenomenon that occurs because the bypass channel 160 is provided. Additionally, although an example in which the communication port 191B in the second pressure adjustment unit 150 is switched to the open state according to the backflow of the ink is described above, the backflow of the ink may occur in a state in which the communication port 191B in the second pressure adjustment unit 150 is in the open state. Additionally, even in a configuration in which no second pressure adjustment unit 150 is provided, the above-described backflow of the ink may occur by providing the bypass channel 160. Note that, the bypass channel 160 may have any configuration as long as it allows at least one of the first channel and the first pressure adjustment unit 120 to communicate with the second channel without the pressure chamber 12 interposed therebetween.

<Configuration of Ejection Unit>

Figure 11A:
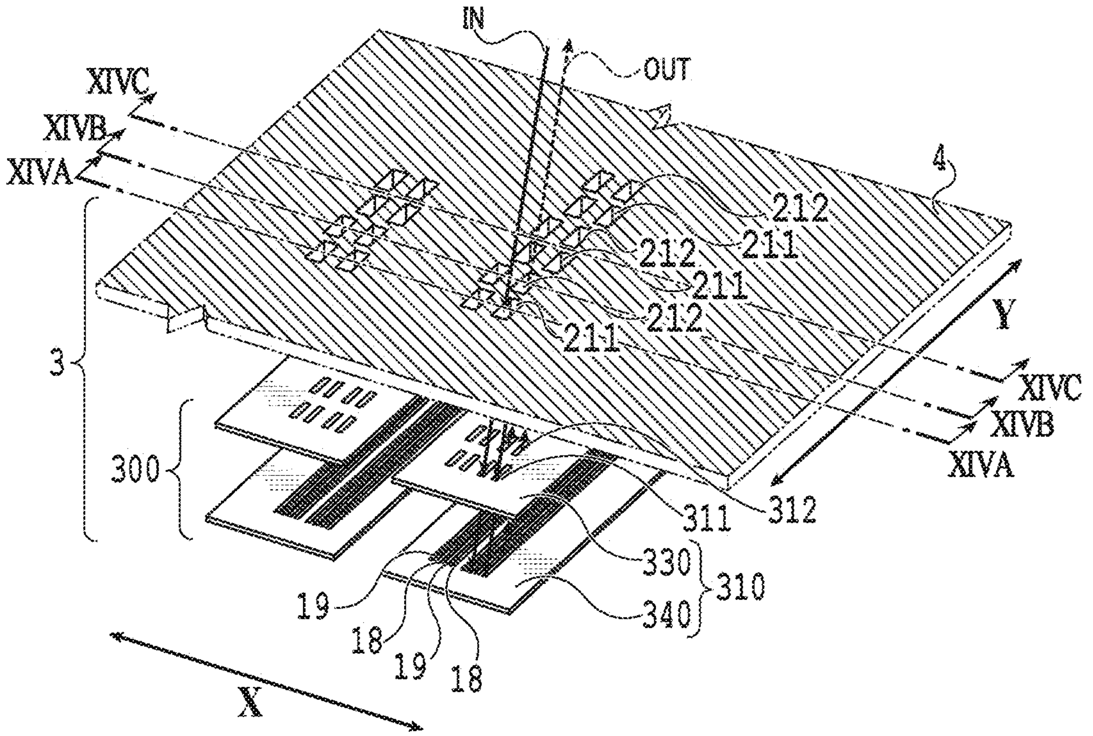
FIG. 11A is a schematic view illustrating the circulation path in an ejection unit.
Figure 11B:
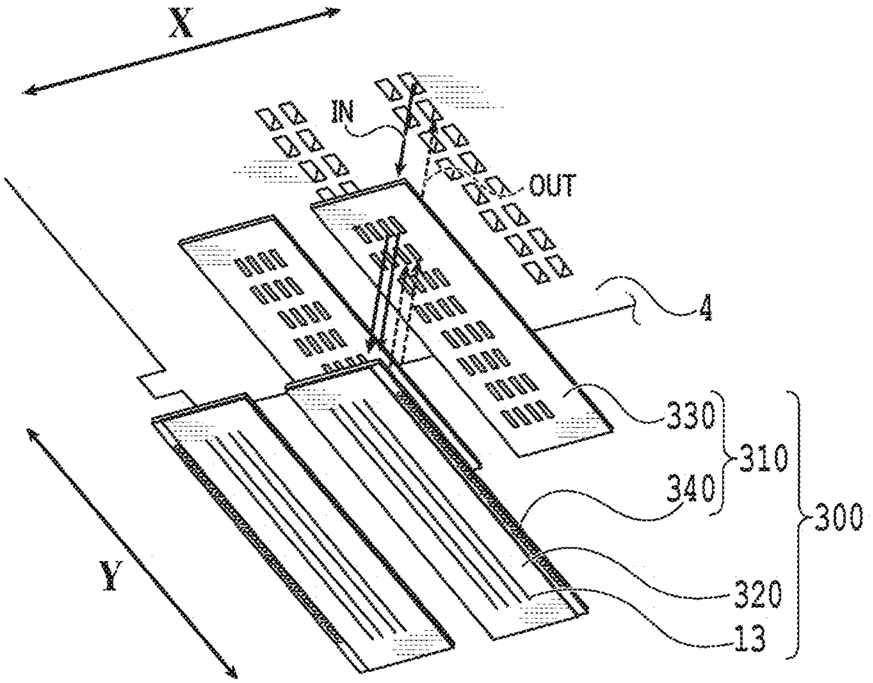
FIG. 11B is a schematic view illustrating the circulation path in the ejection unit.
Figure 12:
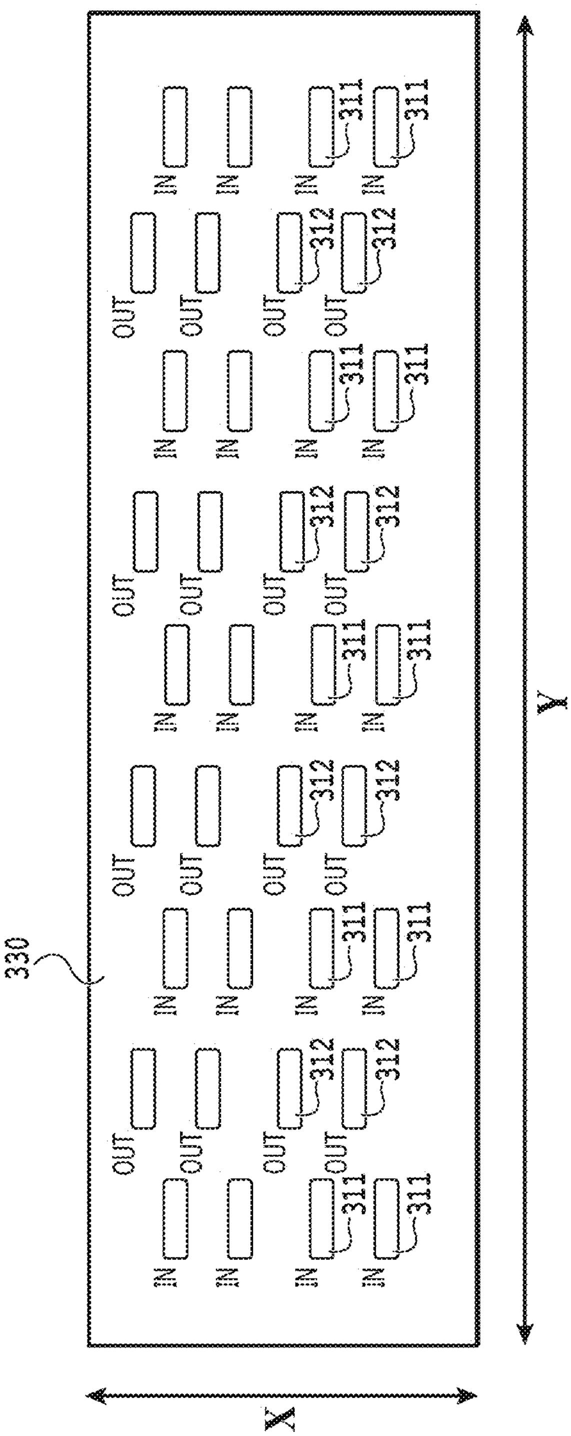
FIG. 12 is a diagram illustrating an opening plate.
Figure 13:
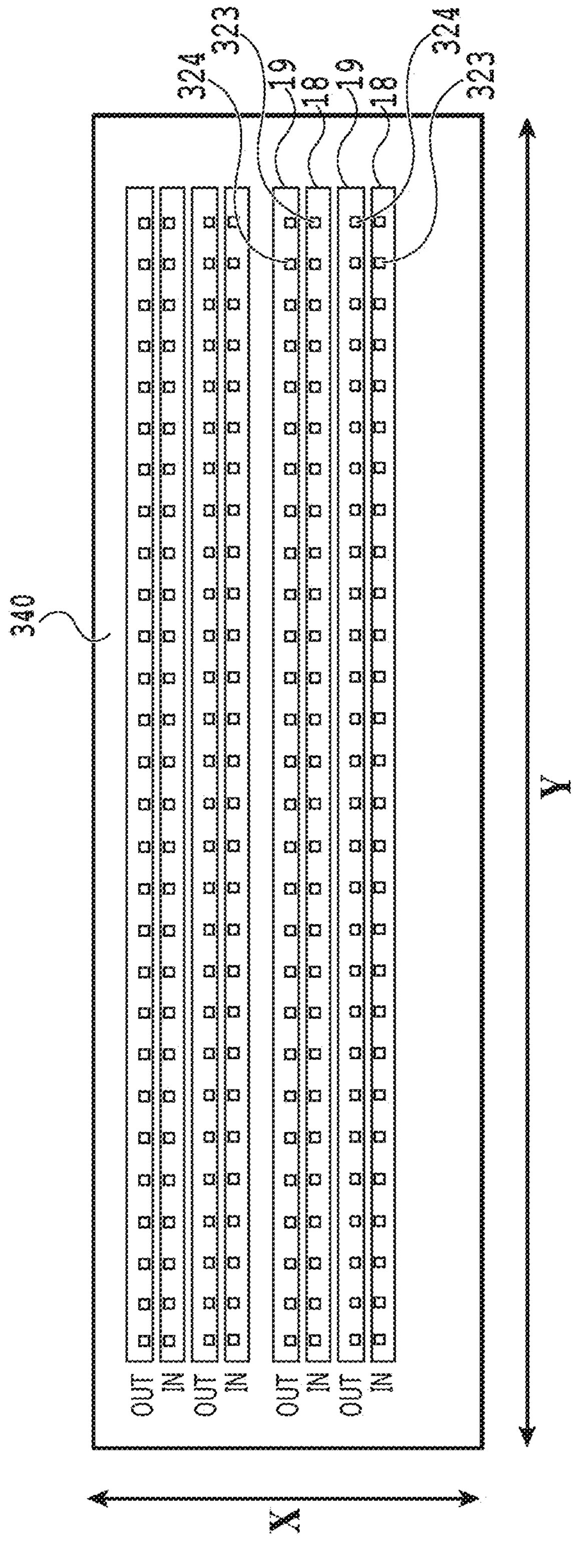
FIG. 13 is a diagram illustrating an ejection element substrate.

FIGS. 11A and 11B are schematic views illustrating the circulation path of one color of ink in the ejection unit 3 of the present embodiment. FIG. 11A is an exploded perspective view of the ejection unit 3 that is viewed from a first support member 4 side, and FIG. 11B is an exploded perspective view of the ejection unit 3 that is viewed from an ejection module 300 side. Note that, arrows indicated with IN and OUT in FIGS. 11A and 11B indicate the flow of the ink. Although the flow of the ink is described for only one color, the other colors have similar flows. Additionally, in FIGS. 11A and 11B, descriptions of the second support member 7 and the electric wiring member 5 are omitted, and the descriptions thereof are also omitted in the subsequent description of the configuration of the ejection unit. Additionally, a cross-section of the first support member 4 that is taken along XI-XI in FIG. 3 is illustrated in FIG. 11A. The ejection module 300 includes an ejection element substrate 340 and an opening plate 330. FIG. 12 is a diagram illustrating the opening plate 330, and FIG. 13 is a diagram illustrating the ejection element substrate 340.

The ink is supplied to the ejection unit 3 from the circulation unit 54 through the joint member 8 (see FIG. 3A). The path of the ink after the ink passes through the joint member 8 until the ink returns to the joint member 8 is described. Note that, in the subsequent drawings, illustrations of the joint member 8 are omitted.

The ejection module 300 includes the ejection element substrate 340 and the opening plate 330 as the silicon substrate 310 and additionally includes the ejection port formation member 320. The ejection element substrate 340, the opening plate 330, and the ejection port formation member 320 form the ejection module 300 by being overlapped and joined with each other such that the channels of the inks communicate with each other and are supported by the first support member 4. The ejection unit 3 is formed with the ejection module 300 being supported by the first support member 4. The ejection element substrate 340 includes the ejection port formation member 320, and the ejection port formation member 320 includes the multiple ejection port rows in which the multiple ejection ports 13 form each row. Thus, a part of the ink supplied through the ink channel in the ejection module 300 is ejected from the ejection port 13. The ink that is not ejected is collected through the ink channel in the ejection module 300.

As illustrated in FIGS. 11A, 11B, and 12, the opening plate 330 includes multiple arrayed ink supply ports 311 and multiple arrayed ink collection ports 312. As illustrated in FIGS. 13 and 14A to 14C, the ejection element substrate 340 includes the multiple arrayed supply connection channels 323 and the multiple arrayed collection connection channels 324. In addition, the ejection element substrate 340 includes the common supply channels 18 communicating with the multiple supply connection channels 323 and the common collection channels 19 communicating with the multiple collection connection channels 324. The ink channels in the ejection unit 3 are formed by the communication between the ink supply channel 48 and the ink collection channel 49 provided in the first support member 4 (see FIG. 3A) and the channels provided in the ejection module 300. A support member supply port 211 is a cross-sectional opening forming the ink supply channel 48, and a support member collection port 212 is a cross-sectional opening forming the ink collection channel 49.

The ink supplied to the ejection unit 3 is supplied to the ink supply channel 48 of the first support member 4 (see FIG. 3A) from a circulation unit 54 (see FIG. 3A) side. The ink that flows through the support member supply port 211 in the ink supply channel 48 is supplied to the common supply channel 18 of the ejection element substrate 340 through the ink supply channel 48 (see FIG. 3A) and the ink supply port 311 of the opening plate 330 and enters the supply connection channel 323. This is a supply side channel. Thereafter, the ink flows to the collection connection channel 324 of a collection side channel through the pressure chamber 12 of the ejection port formation member 320 (see FIG. 3B). Details of the flow of the ink in the pressure chamber 12 are described later.

In the collection side channel, the ink that enters the collection connection channel 324 flows to the common collection channel 19. Thereafter, the ink flows to the ink collection channel 49 of the first support member 4 from the common collection channel 19 through the ink collection port 312 of the opening plate 330 and is collected into the circulation unit 54 through the support member collection port 212.

A region in the opening plate 330 that does not include the ink supply port 311 and the ink collection port 312 corresponds to a region partitioning the support member supply port 211 and the support member collection port 212 in the first support member 4. Additionally, the first support member 4 does not include the opening in the region. Such a region is used as an adherence region for a case of adhering the ejection module 300 and the first support member 4 with each other.

In FIG. 12, in the opening plate 330, multiple rows of multiple openings arrayed in the X direction are provided in the Y direction, and openings for supplying (IN) and openings for collecting (OUT) are arrayed alternately in the Y direction so as to deviate from each other by a half pitch in the X direction. In FIG. 13, in the ejection element substrate 340, the common supply channels 18 communicating with the multiple supply connection channels 323 arrayed in the Y direction and the common collection channels 19 communicating with the multiple collection connection channels 324 arrayed in the Y direction are arrayed alternately in the X direction. The common supply channels 18 and the common collection channels 19 are provided for each type of the inks, and in addition, the numbers of the common supply channels 18 and the common collection channels 19 to be arranged are determined according to the number of the ejection port rows of each color. Additionally, the numbers of the supply connection channels 323 and the collection connection channels 324 to be arranged also correspond to the ejection ports 13. However, the correspondence is not necessarily one-to-one, and one supply connection channel 323 and one collection connection channel 324 may correspond to the multiple ejection ports 13.

The ejection module 300 is formed by overlapping and joining the above-described opening plate 330 and ejection element substrate 340 with each other such that the channels of the inks communicate with each other, and with the ejection module 300 being supported by the first support member 4, the ink channel including the supply channel and the collection channel as described above is formed.

Figure 14A:
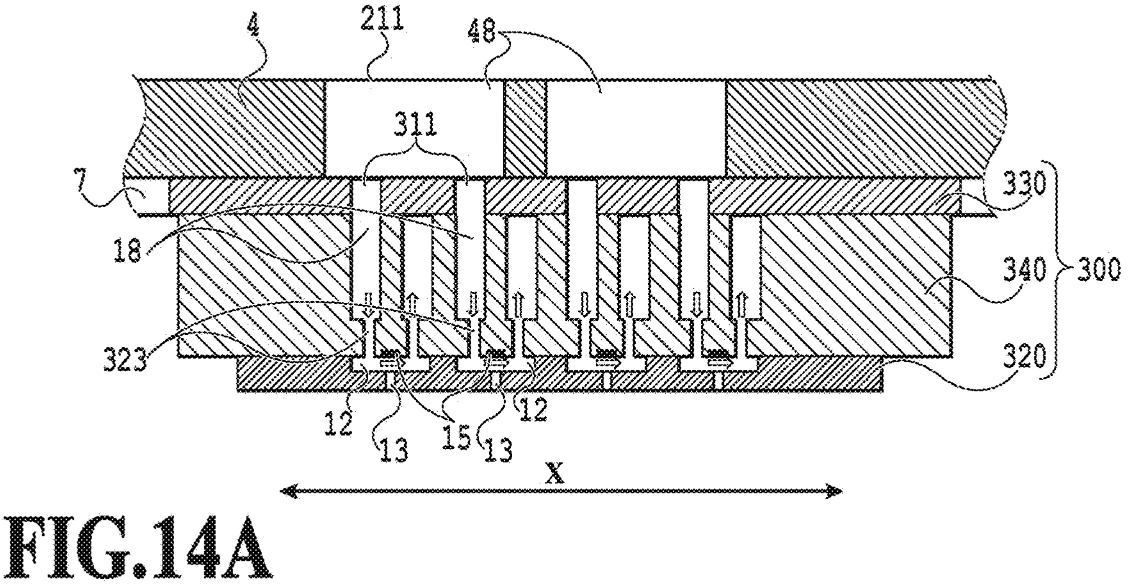
FIG. 14A is a cross-sectional view illustrating the ink flow in the ejection unit.
Figure 14B:
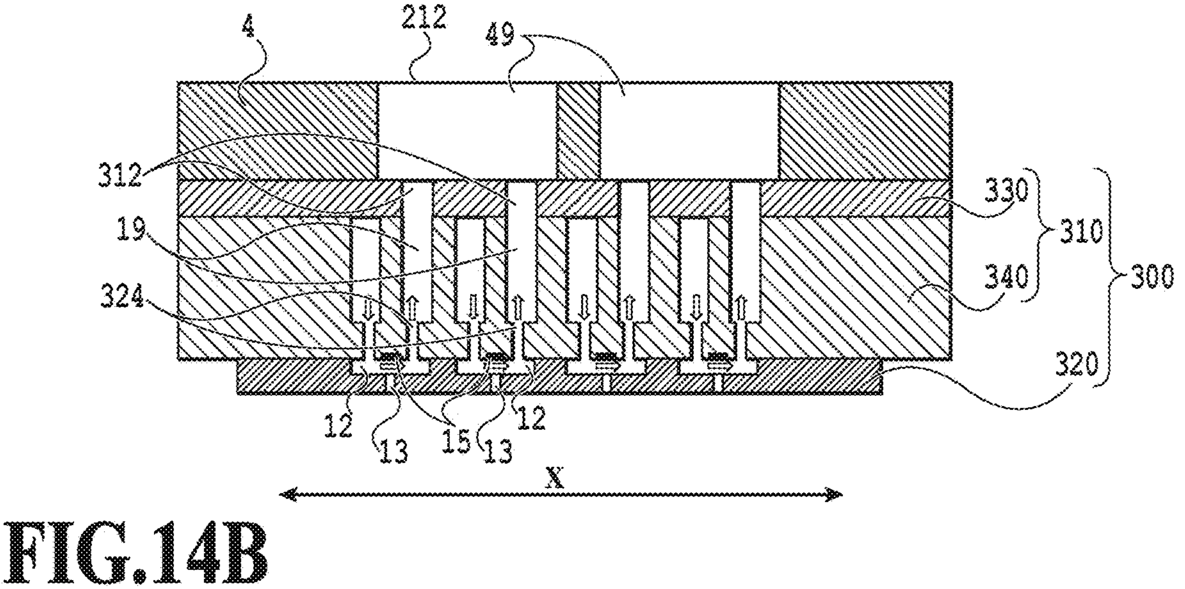
FIG. 14B is a cross-sectional view illustrating the ink flow in the ejection unit.
Figure 14C:
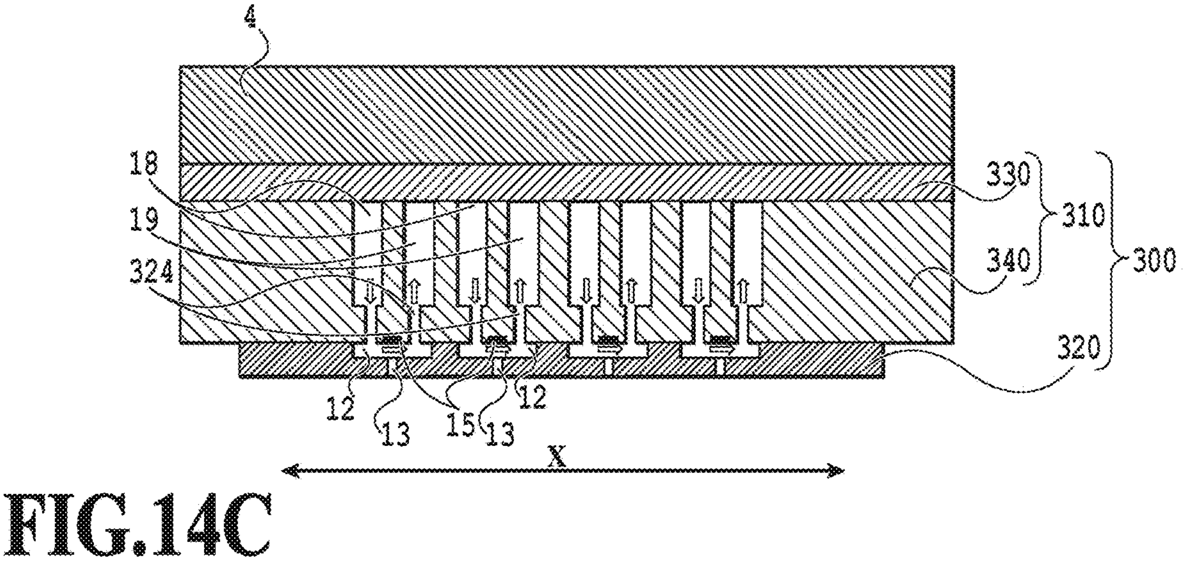
FIG. 14C is a cross-sectional view illustrating the ink flow in the ejection unit.

FIGS. 14A to 14C are cross-sectional views illustrating the ink flows in different portions of the ejection unit 3. FIG. 14A illustrates a cross-section taken along XIVA-XIVA in FIG. 11A, which is a cross-section of a portion in the ejection unit 3 in which the ink supply channel 48 and the ink supply port 311 communicate with each other. Additionally, FIG. 14B illustrates a cross-section taken along XIVB-XIVB in FIG. 11A, which is a cross-section of a portion in the ejection unit 3 in which the ink collection channel 49 and the ink collection port 312 communicate with each other. Moreover, FIG. 14C illustrates a cross-section taken along XIVC-XIVC in FIG. 11A, which is a cross-section of a portion in which the ink supply port 311 and the ink collection port 312 communicate with no channel of the first support member 4.

In the supply channel that supplies the ink, as illustrated in FIG. 14A, the ink is supplied from a portion in which the ink supply channel 48 of the first support member 4 and the ink supply port 311 of the opening plate 330 are overlapped and communicate with each other. Additionally, in the collection channel that collects the ink, as illustrated in FIG. 14B, the ink is collected from a portion in which the ink collection channel 49 of the first support member 4 and the ink collection port 312 of the opening plate 330 are overlapped and communicate with each other. Moreover, as illustrated in FIG. 14C, the ejection unit 3 also includes a region in which no opening is provided in a part of the opening plate 330. In such a region, the supplying and collecting of the ink between the ejection element substrate 340 and the first support member 4 are not implemented. The supplying of the ink is implemented in a region provided with the ink supply port 311 as illustrated in FIG. 14A, and the collecting of the ink is implemented in a region provided with the ink collection port 312 as illustrated in FIG. 14B. Note that, although a configuration using the opening plate 330 is described as an example in the present embodiment, a mode that does not use the opening plate 330 may be applied. For example, a configuration in which a channel corresponding to the ink supply channel 48 and the ink collection channel 49 is formed in the first support member 4, and the ejection element substrate 340 is joined to the first support member 4 may be applied.

Figure 15A:
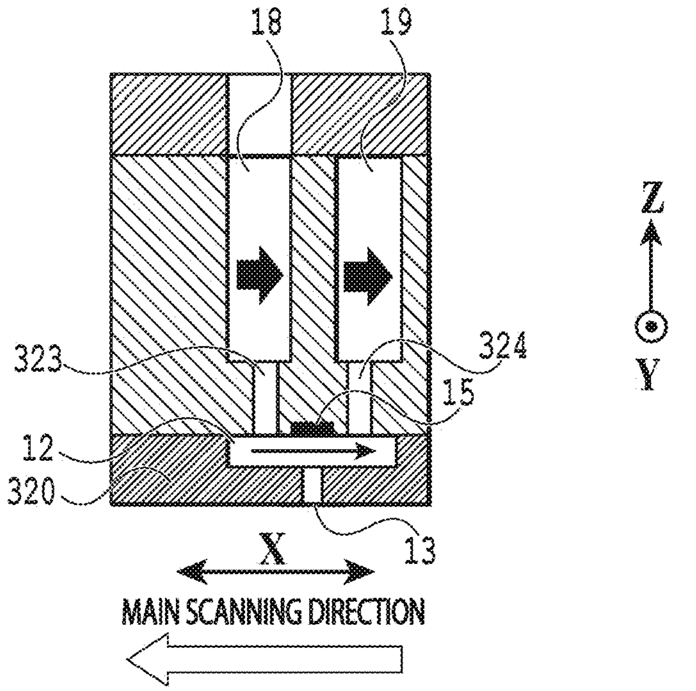
FIG. 15A is a cross-sectional view illustrating the vicinity of an ejection port.
Figure 15B:
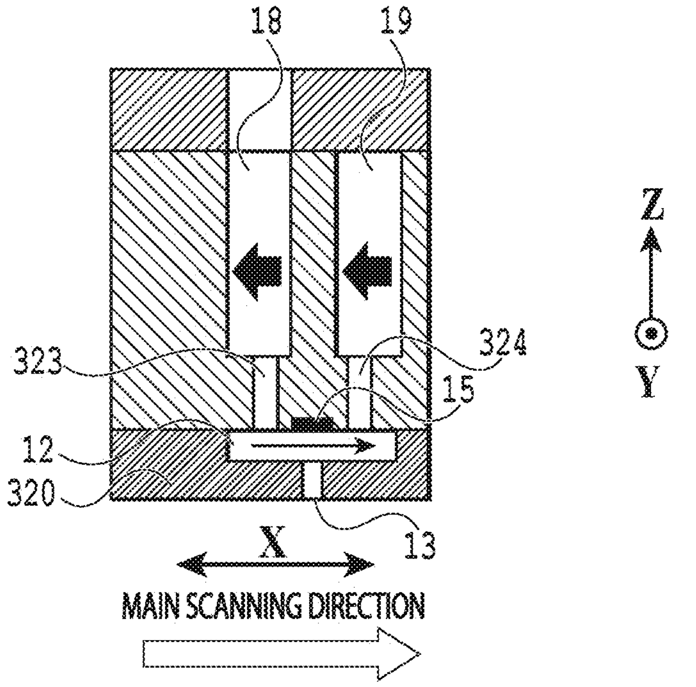
FIG. 15B is a cross-sectional view illustrating the vicinity of the ejection port.
Figure 16A:
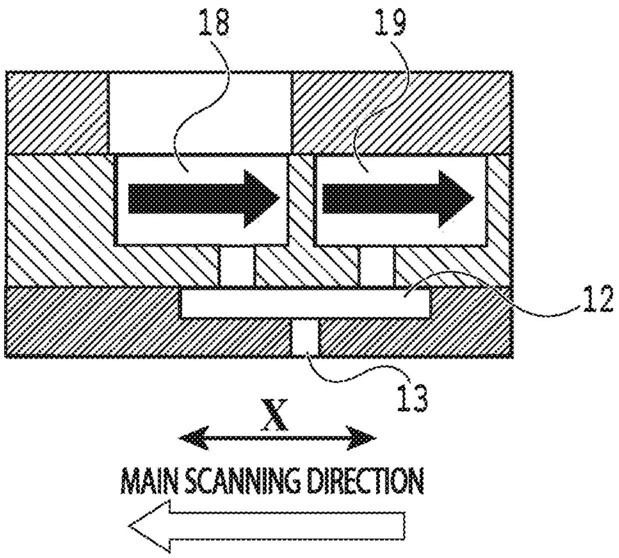
FIG. 16A is a cross-sectional view illustrating a comparative example of the vicinity of the ejection port.
Figure 16B:
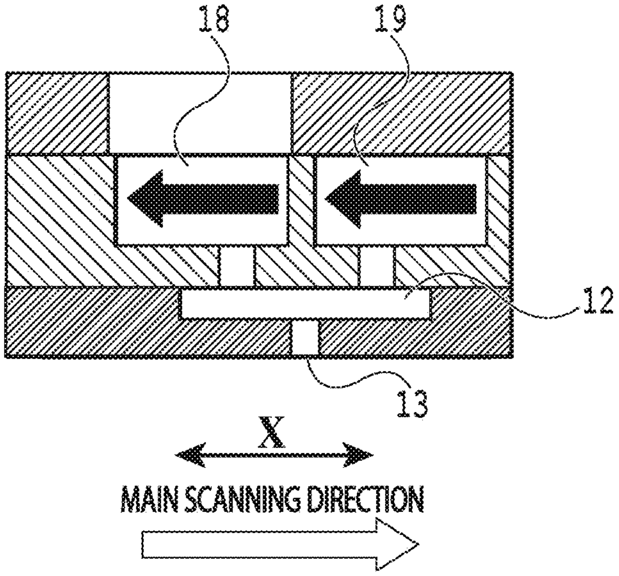
FIG. 16B is a cross-sectional view illustrating the comparative example of the vicinity of the ejection port.

FIGS. 15A and 15B are cross-sectional views illustrating the vicinity of the ejection port 13 in the ejection module 300, and FIGS. 16A and 16B are cross-sectional views illustrating an ejection module having a configuration in which the common supply channel 18 and the common collection channel 19 are expanded in the X direction as a comparative example. Note that, a bold arrow illustrated in the common supply channel 18 and the common collection channel 19 in FIGS. 15A, 15B, 16A, and 16B indicates an oscillation of the ink in a mode using the serial type liquid ejection apparatus 50. The ink supplied to the pressure chamber 12 through the common supply channel 18 and the supply connection channel 323 is ejected from the ejection port 13 with the ejection element 15 being driven. In a case where the ejection element 15 is not driven, the ink is collected into the common collection channel 19 from the pressure chamber 12 through the collection connection channel 324 as the collection channel.

In a case where the ejection is performed from the circulating ink as described above in a mode using the serial type liquid ejection apparatus 50, the ejection of the ink is not a little affected by the oscillation of the ink in the ink channel that is caused by the main scanning of the liquid ejection head 1. Specifically, the effect of the oscillation of the ink in the ink channel may appear as an unevenness of the ejection amount of the ink and a deviation of the ejection direction. As illustrated in FIGS. 16A and 16B, in a case where the common supply channel 18 and the common collection channel 19 have a cross-section shape with a wide width in the X direction, which is the main scanning direction, the ink in the common supply channel 18 and the common collection channel 19 is likely to be subject to inertial force in the main scanning direction, and the ink oscillates greatly. As a result, there is a possibility that the oscillation of the ink affects the ejection of the ink from the ejection port 13. Additionally, in a case where the common supply channel 18 and the common collection channel 19 are expanded in the X direction, a distance between the colors is expanded, and thus there is a possibility of a deterioration of the printing efficiency.

To deal with this, the common supply channel 18 and the common collection channel 19 in the present embodiment have a configuration in which the common supply channel 18 and the common collection channel 19 both extend in the Y direction and also extend in the Z direction, which is perpendicular to the X direction as the main scanning direction, in the cross-sections illustrated in FIGS. 15A and 15B. With the above configuration, it is possible to reduce channel widths of the common supply channel 18 and the common collection channel 19 in the main scanning direction. The small channel widths of the common supply channel 18 and the common collection channel 19 in the main scanning direction reduces the oscillation of the ink that is caused by the inertial force (the black bold arrow in FIGS. 15A and 15B) acting toward the opposite side of the main scanning direction and affects the ink in the common supply channel 18 and the common collection channel 19 during the main scanning. Therefore, it is possible to suppress the effect on the ejection of the ink that is caused by the oscillation of the ink. Additionally, a cross-sectional area is increased by extending the common supply channel 18 and the common collection channel 19 in the Z direction, and a channel pressure drop is reduced.

As described above, a configuration in which the oscillation of the ink in the common supply channel 18 and the common collection channel 19 during the main scanning is accordingly reduced by reducing the channel widths of the common supply channel 18 and the common collection channel 19 in the main scanning direction is applied; however, the oscillation does not disappear completely. Therefore, in order to suppress the unevenness of the ejection between the ink types that may occur even with the reduced oscillation, in the present embodiment, the common supply channel 18 and the common collection channel 19 have a configuration to be arranged in a position in which the common supply channel 18 and the common collection channel 19 are overlapped with each other in the X direction.

As mentioned above in the present embodiment, the supply connection channel 323 and the collection connection channel 324 are provided to correspond to the ejection port 13, and the supply connection channel 323 and the collection connection channel 324 have a correspondence relationship to be arranged side by side in the X direction with the ejection port 13 arranged therebetween. For this reason, in a case where there is a portion in which the common supply channel 18 and the common collection channel 19 are not overlapped with each other in the X direction, and the correspondence relationship between the supply connection channel 323 and the collection connection channel 324 in the X direction is lost, the flow of the ink in the X direction in the pressure chamber 12 and the ejection are affected. If the effect of the oscillation of the ink is added thereto, there is also a possibility that the ejection of the ink from each ejection port is further affected.

Therefore, with the common supply channel 18 and the common collection channel 19 being arranged in the position in which the common supply channel 18 and the common collection channel 19 are overlapped with each other in the X direction, the ink oscillations in the common supply channel 18 and the common collection channel 19 during the main scanning are substantially even in any positions in the Y direction in which the ejection ports 13 are arrayed. As a result, it is possible to perform the ejection stably without a great variation in a pressure difference between a common supply channel 18 side and a common collection channel 19 side that occurs in the pressure chamber 12.

Additionally, in some of the liquid ejection heads circulating the ink, the channel to supply the ink to the liquid ejection head and the channel to collect the ink are formed of the same channel; however, in the present embodiment, the common supply channel 18 and the common collection channel 19 are different channels. In addition, the supply connection channel 323 and the pressure chamber 12 communicate with each other, the pressure chamber 12 and the collection connection channel 324 communicate with each other, and the ink is ejected from the ejection port 13 of the pressure chamber 12. In other words, the pressure chamber 12 that is a path connecting the supply connection channel 323 and the collection connection channel 324 with each other includes the ejection port 13. Therefore, the ink flow that flows from a supply connection channel 323 side to a collection connection channel 324 side is generated in the pressure chamber 12, and the ink in the pressure chamber 12 is circulated efficiently. With the ink in the pressure chamber 12 being circulated efficiently, the ink in the pressure chamber 12, which may be susceptible to evaporation of from the ejection port 13, can be kept fresh.

Moreover, since the two channels, the common supply channel 18 and the common collection channel 19, communicate with the pressure chamber 12, in a case where it is necessary to perform the ejection at a high flow rate, it is also possible to supply the ink from both the channels. In other words, comparing with the configuration in which the supplying and collecting of the ink is implemented by only one channel, the configuration of the present embodiment has a merit that it is possible not only to perform the circulation efficiently but also to handle the ejection at the high flow rate.

Furthermore, the effect of the oscillation of the ink is further prevented by arranging the common supply channel 18 and the common collection channel 19 in positions close to each other in the X direction. Desirably, a distance between the channels is 75 μm to 100 μm.

Figure 17:
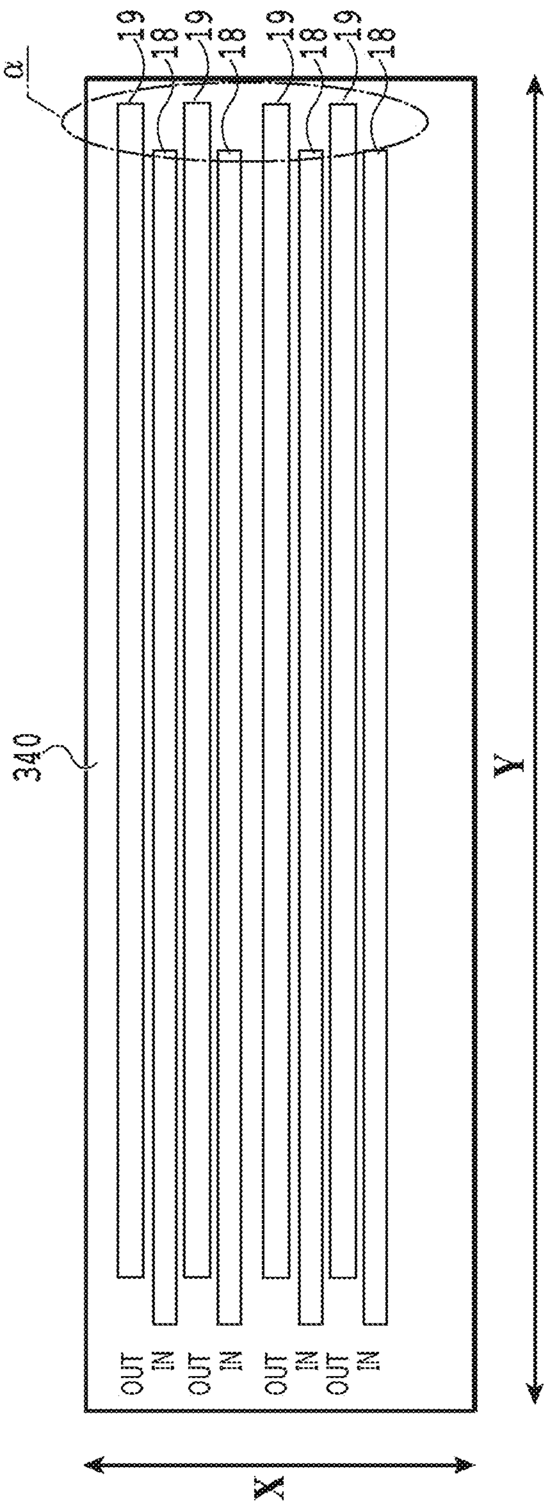
FIG. 17 is a diagram illustrating a comparative example of the ejection element substrate.

FIG. 17 is a diagram illustrating the ejection element substrate 340 as a comparative example. Note that, in FIG. 17, illustrations of the supply connection channel 323 and the collection connection channel 324 are omitted. The ink subjected to heat energy by the ejection element 15 in the pressure chamber 12 flows into the common collection channel 19; for this reason, the ink at a temperature relatively higher than the temperature of the ink in the common supply channel 18 flows. In this case, in the comparative example, there is a portion in which there is only the common collection channel 19 in a part of the ejection element substrate 340 in the X direction like an a portion surrounded by a dash-dotted line in FIG. 17. In this case, there is a possibility that the temperature is increased locally in the portion, and the temperature in the ejection module 300 becomes uneven, which affects the ejection.

The ink at a temperature relatively lower than that of the common collection channel 19 flows in the common supply channel 18. Therefore, in a case where the common supply channel 18 and the common collection channel 19 are adjacent to each other, the temperatures of the common supply channel 18 and the common collection channel 19 in the vicinity of the adjacent portions partially neutralize each other, and thus the temperature rise is suppressed. Therefore, the common supply channel 18 and the common collection channel 19 preferably exist in the position in which the common supply channel 18 and the common collection channel 19 are overlapped with each other in the X direction at substantially the same length and adjacent to each other.

Figure 18A:
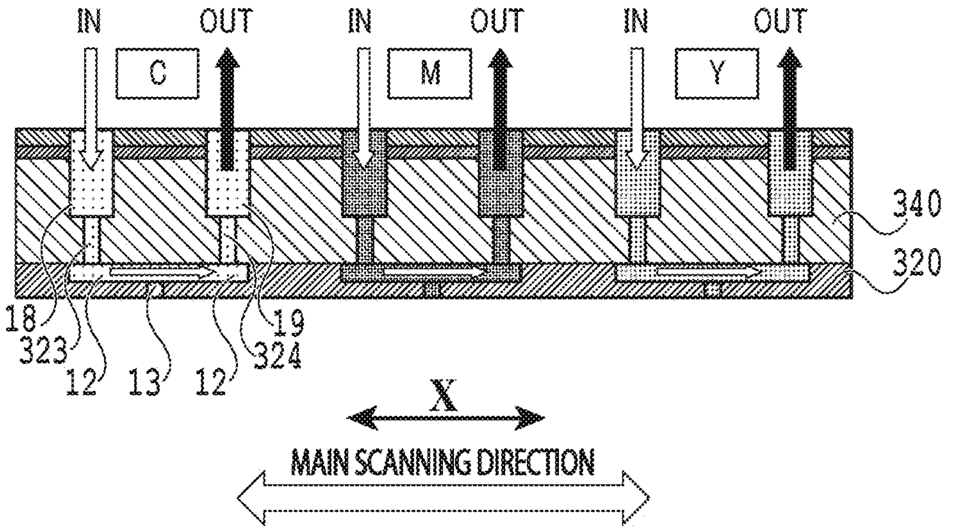
FIG. 18A is a diagram illustrating a channel configuration of the liquid ejection head.
Figure 18B:
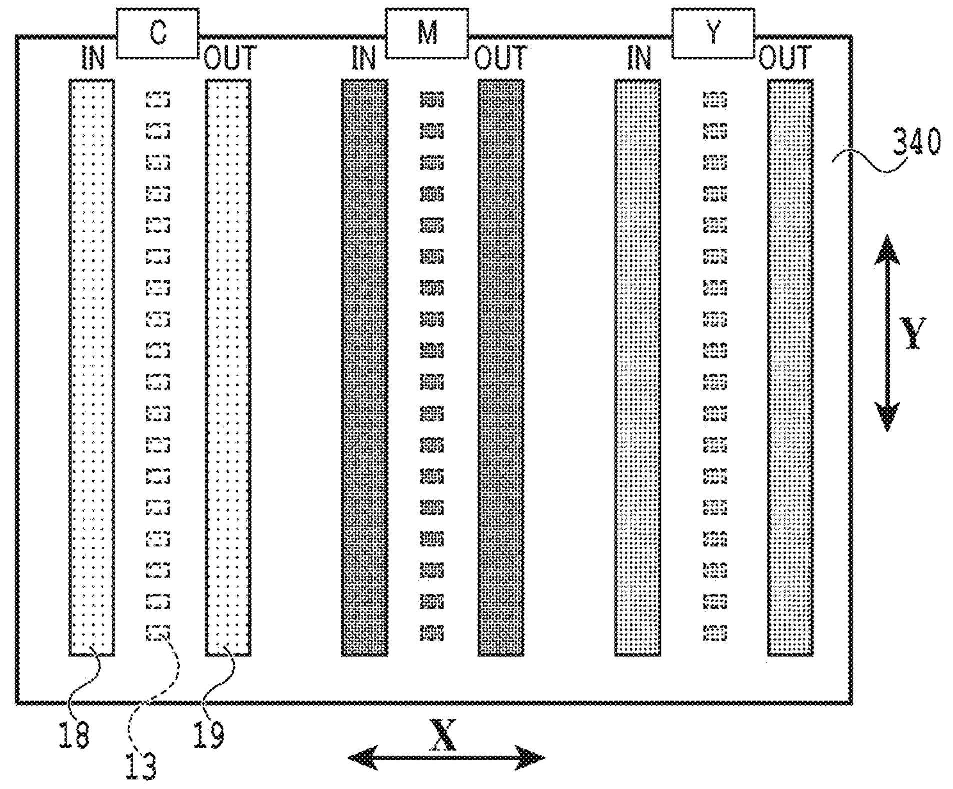
FIG. 18B is a diagram illustrating the channel configuration of the liquid ejection head.

FIGS. 18A and 18B are diagrams illustrating a channel configuration of the liquid ejection head 1 that corresponds to each of three colors of inks, which are cyan (C), magenta (M), and yellow (Y). The liquid ejection head 1 is provided with the circulation channel for each type of ink as illustrated in FIG. 18A. The pressure chamber 12 is provided along the X direction, which is the main scanning direction of the liquid ejection head 1. Additionally, as illustrated in FIG. 18B, the common supply channel 18 and the common collection channel 19 are provided along the ejection port row, which is the arrayed ejection ports 13, and the common supply channel 18 and the common collection channel 19 are provided to extend in the Y direction with the ejection port row being arranged therebetween.

<Connection Between Main Body Portion and Liquid Ejection Head>

Figure 19:
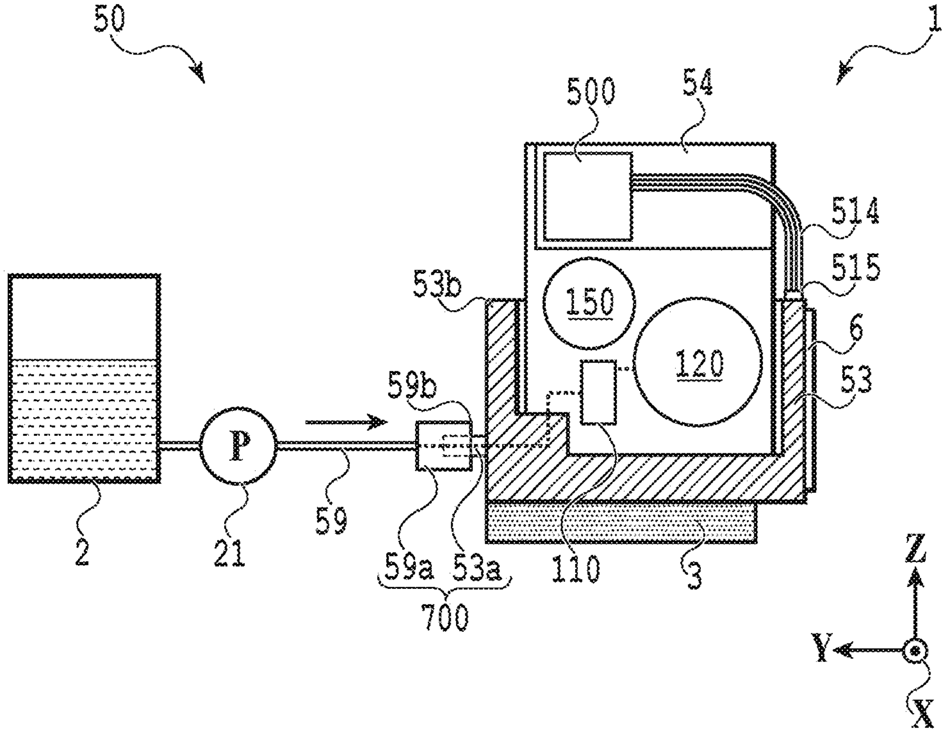
FIG. 19 is a diagram illustrating a connection state between a main body portion of the liquid ejection apparatus and the liquid ejection head.

FIG. 19 is a schematic configuration diagram illustrating more specifically a connection state between the ink tank 2 and the external pump 21, which are provided in a main body portion of the liquid ejection apparatus 50 of the present embodiment, and the liquid ejection head 1 and arrangement of the circulation pump and the like. The liquid ejection apparatus 50 in the present embodiment has a configuration in which only the liquid ejection head 1 can be easily replaced in a case where a failure occurs in the liquid ejection head 1. Specifically, a liquid connection unit 700 that can easily perform connecting and detaching between the ink supply tube 59 connected to the external pump 21 and the liquid ejection head 1. Thus, it is possible to easily attach and detach only the liquid ejection head 1 to and from the liquid ejection apparatus 50.

As illustrated in FIG. 19, the liquid connection unit 700 includes the liquid connector insertion port 53*a* provided to extend from the head housing 53 of the liquid ejection head 1 and a cylindrical liquid connector 59*a* into which the liquid connector insertion port 53*a* can be inserted. The liquid connector insertion port 53*a* is fluidically connected to the ink supply channel formed in the liquid ejection head 1 and is connected to the first pressure adjustment unit 120 through the above-mentioned filter 110. Additionally, the liquid connector 59*a* is provided at a tip of the ink supply tube 59 connected to the external pump 21 that pressurizes and supplies the ink in the ink tank 2 to the liquid ejection head 1.

As described above, the liquid ejection head 1 illustrated in FIG. 19 can easily perform works to attach and detach and replace the liquid ejection head 1 by the liquid connection unit 700. However, in a case where the sealing properties between the liquid connector insertion port 53*a* and the liquid connector 59*a* are reduced, there is a possibility that the ink pressurized and supplied by the external pump 21 leaks from the liquid connection unit 700. In a case where the leaked ink is attached to the circulation pump 500 or the like, there is a possibility that a failure occurs in an electric system. To deal with this, in the present embodiment, the circulation pump and the like are arranged as below.

<Arrangement of Circulation Pump and the Like>

As illustrated in FIG. 19, in the present embodiment, in order to avoid the attaching of the ink leaked from the liquid connection unit 700 to the circulation pump 500, the circulation pump 500 is arranged higher than the liquid connection unit 700 in the gravity direction. In other words, the circulation pump 500 is arranged higher than the liquid connector insertion port 53*a*, which is an inlet of the liquid of the liquid ejection head 1 in the gravity direction. In addition, the circulation pump 500 is arranged in a position in which the circulation pump 500 is not put in contact with a member forming the liquid connection unit 700. Thus, even in a case where the ink leaks from the liquid connection unit 700, the ink flows in the horizontal direction, which is an opening direction of the liquid connector 59*a*, or downward in the gravity direction; for this reason, it is possible to suppress the reaching of the ink to the circulation pump 500 at a high position in the gravity direction. Additionally, since the circulation pump 500 is arranged in a position distant from the liquid connection unit 700, a possibility that the ink flows down the member and reaches the circulation pump 500 is reduced.

Additionally, an electric connection unit 515 that electrically connects the circulation pump 500 and the electric contact substrate 6 with each other through a flexible wiring member 514 is provided higher than the liquid connection unit 700 in the gravity direction. Therefore, it is possible to reduce a possibility of an electric trouble caused by the ink from the liquid connection unit 700.

Moreover, in the present embodiment, a wall portion 53*b* of the head housing 53 is provided; therefore, even in a case where the ink squirts out of an opening 59*b* of the liquid connection unit 700, it is possible to block the ink and to reduce the possibility of reaching the circulation pump 500 and the electric connection unit 515.

<Ink Backflow Due to Water Head Difference>

Next, a characteristic portion of the present invention is described below. From the state after the circulation is stopped in FIG. 10D, once the pressure in the first pressure control chamber 122 and the pressure in the second pressure control chamber 152 are completely equal to each other, the valve 190A is switched to the closed state, and the ink flow into the liquid ejection head 1 is stopped. Descriptions of the second pressure adjustment unit 150 are omitted in the descriptions below.

Figure 20B:
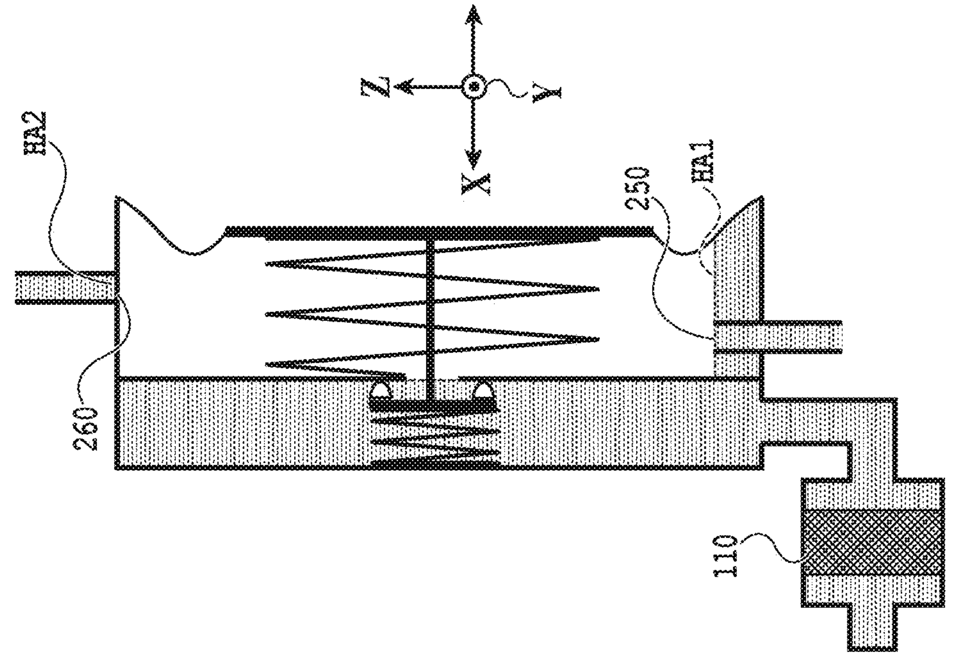
FIG. 20B is a diagram illustrating the flow of the ink in the liquid ejection head in the conventional configuration.
Figure 20A:
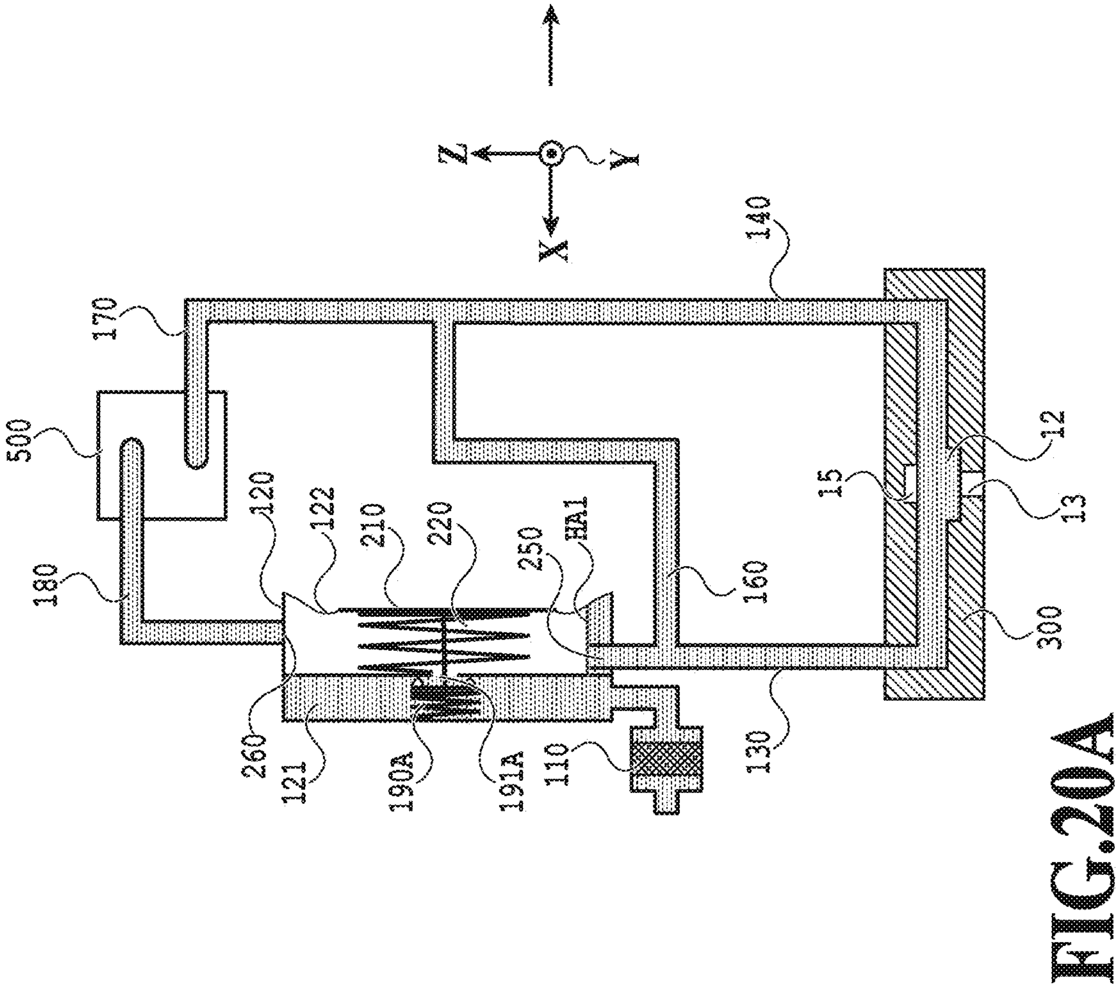
FIG. 20A is a diagram illustrating the flow of the ink in the liquid ejection head in a conventional configuration.

FIG. 20A is a diagram illustrating the flow of the ink in the liquid ejection head in a conventional configuration, and FIG. 20B is an enlarged view illustrating the first pressure adjustment unit 120 in FIG. 20A. FIG. 20 illustrates the state after the circulation is stopped in FIG. 10D. In the conventional configuration, the supply port 260 in the first pressure control chamber 122 is positioned vertically higher than a discharge port 250. The ink for the first pressure control chamber 122 is supplied from the supply port 260 and discharged from the discharge port 250. In the above configuration, there is a possibility that an ink liquid surface in the first pressure control chamber 122 is lowered to a liquid surface HA1, which is a height at which the discharge port 250 opens.

In a state after the circulation is stopped, in a case where the supply port 260 is arranged higher than the discharge port 250 as illustrated in FIGS. 20A and 20B, there is no liquid connection between the supply port 260 and the discharge port 250. Therefore, a meniscus is formed in the supply port 260, and a water head difference pressure is generated between a liquid surface HA2 on which the meniscus is formed in the supply port 260 and the liquid surface HA1. In addition, the liquid surface HA1 and the liquid surface HA2 are in continuous liquid connection with each other through the circulation pump 500, the collection channel 140, and the ejection module 300. Therefore, because of this water head difference pressure, the liquid surface HA2 may be moved to a circulation pump 500 side with the backflow of the ink. In other words, the liquid surface HA2 on which the meniscus is formed in the supply port 260 may recede toward the circulation pump 500.

In a case where the circulation pump 500 is positioned higher than the first pressure adjustment unit 120 in the vertical direction as illustrated in FIG. 20A, the receding liquid surface HA2 may reach the circulation pump 500. Specifically, in a case where an outlet of the circulation pump 500 for the ink circulation is positioned higher than the discharge port 250 of the first pressure adjustment unit 120 in the vertical direction, the receding liquid surface HA2 may reach the circulation pump 500. For example, in a state in which the liquid surface HA2 is moved to the extent that there is no water head difference with the liquid surface HA1, the air is mixed into the circulation pump 500. In a case where the air is mixed into the circulation pump 500, there is a possibility that the pressure change in the pump chamber 503 (see FIG. 9) is reduced by the expansion and contraction of the bubbles, and the delivered amount of the liquid is reduced. To deal with this, in the present embodiment, the supply port 260 is provided lower than the liquid surface HA1, in other words, the supply port 260 is provided lower than the discharge port 250 in the vertical direction so as to invert the water head difference between the liquid surface HA1 and the liquid surface HA2 and to suppress the entering of the air into the circulation pump 500.

Figure 21:
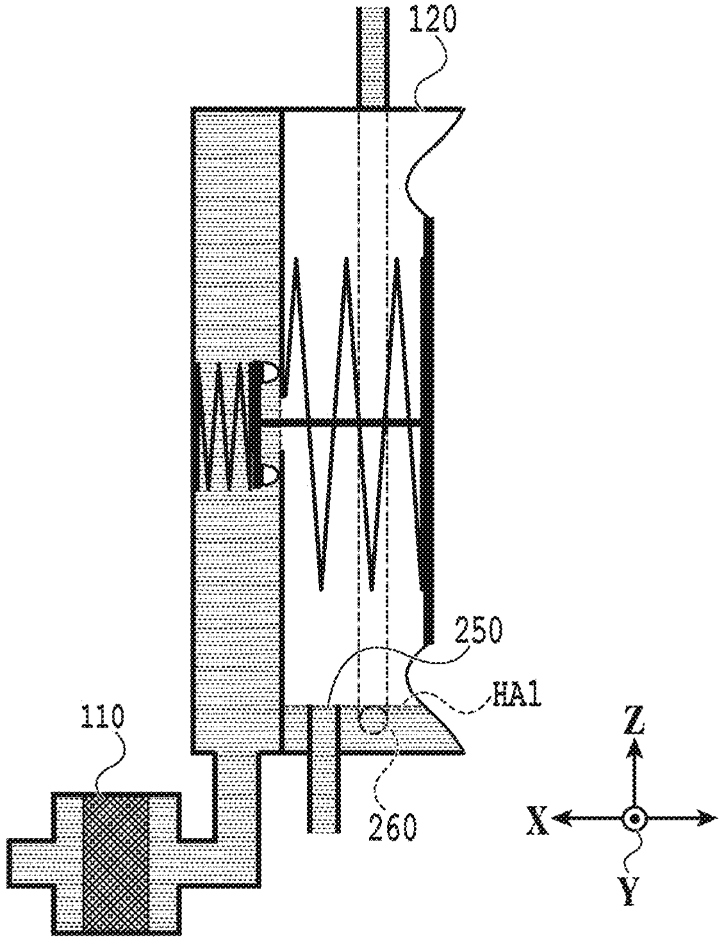
FIG. 21 is a diagram illustrating a first pressure adjustment unit.

FIG. 21 is a diagram illustrating the first pressure adjustment unit 120 in the present embodiment. The first pressure adjustment unit 120 is formed such that the liquid can flow therein through the filter 110. The first pressure adjustment unit 120 includes the discharge port 250 to discharge the liquid to the ejection module 300 and the supply port 260 to which the liquid is supplied from the circulation pump 500. In the present embodiment, in a usage orientation of the liquid ejection head 1, the opening as the outlet in the circulation pump 500 is positioned higher than the discharge port 250 in the vertical direction, and specifically, the uppermost portion of the opening of the circulation pump 500 that is connected to the supply port is positioned higher than the uppermost portion of the discharge port 250 in the vertical direction.

Additionally, the discharge port 250 in the first pressure adjustment unit 120 is positioned higher than the supply port 260 in the vertical direction or at the same height as that of the supply port 260 in the vertical direction in the usage orientation of the liquid ejection head 1. Specifically, the uppermost portion of the discharge port 250 in the vertical direction is positioned higher in the vertical direction than the lowermost portion of the supply port 260 in the vertical direction. Note that, no backflow occurs in a case where the discharge port 250 and the supply port 260 are positioned at the same height in the vertical direction. Additionally, in the usage orientation of the liquid ejection head 1, the uppermost portion of the discharge port 250 may be positioned higher in the vertical direction than the uppermost portion of the supply port 260 or may be positioned at the same height as that of the uppermost portion of the supply port 260 in the vertical direction.

Moreover, the lowermost portion of the discharge port 250 may be positioned higher than the uppermost portion of the supply port 260 in the vertical direction.

In this case, the "usage orientation" is "an orientation in a case where the liquid is ejected from the liquid ejection head 1 provided in the liquid ejection apparatus 50, and the image, character, and the like are printed on the printing medium".

In the present embodiment, in the usage orientation of the liquid ejection head 1, the discharge port 250 opens such that an opening surface is a horizontal surface, and the supply port 260 opens such that an opening surface is a vertical surface.

Additionally, in a state in which the circulation pump 500 is stopped, the discharge port 250 and the supply port 260 are in liquid communication with each other. With the discharge port 250 and the supply port 260 being in liquid communication with each other in a state in which the circulation pump 500 is stopped, it is possible to suppress the backflow of the ink.

Moreover, the discharge port 250 and the supply port 260 are positioned lower than a central portion of the first pressure adjustment unit 120 in the vertical direction. Thus, it is possible to reduce the amount of the liquid accumulating in the first pressure adjustment unit 120, and it is possible to reduce the amount of the ink that does not directly contribute to the circulation.

With the above configuration, since the supply port 260 is positioned lower than the liquid surface HA1, even in a state after the circulation is stopped, it is possible to maintain the state in which the liquid surface of the discharge port 250 and the supply port 260 are connected to each other, and it is possible to suppress the backflow of the ink without the water head difference pressure like a conventional case. That is, it is possible to suppress the entering of the air into the pump outlet channel 180 and mixing of the air into the circulation pump 500.

The circulation pump 500 of the present embodiment has a configuration in which the backflow is suppressed by the check valves 504*a* and 504*b* (see FIG. 9). However, the check valves 504*a* and 504*b* transition between the open state and the closed state according to a relatively great pressure change caused by the volume change in the pump chamber 503. In other words, the complete closed state is not achieved by a small pressure change like the water head difference pressure, and it does not necessarily suppress the backflow. This is because, in a case where a configuration in which the check valves 504*a* and 504*b* are normally closed is employed, force to displace from the closed state to the open state is required, and this leads deterioration of the pump performance accordingly.

<<Modification>>

Next, various modifications of the above-described embodiment are described. In the present embodiment, a configuration in which the circulation pump 500 is mounted in the serial scanning type liquid ejection head 1 is described; however, it is also applicable to a liquid ejection apparatus in which a line head that performs printing while the liquid ejection head is fixed is mounted. Additionally, it is also applicable to a mode in which the circulation pump 500 is not mounted in the liquid ejection head 1 but mounted in the liquid ejection apparatus 50.

<First Modification>

Figure 22:
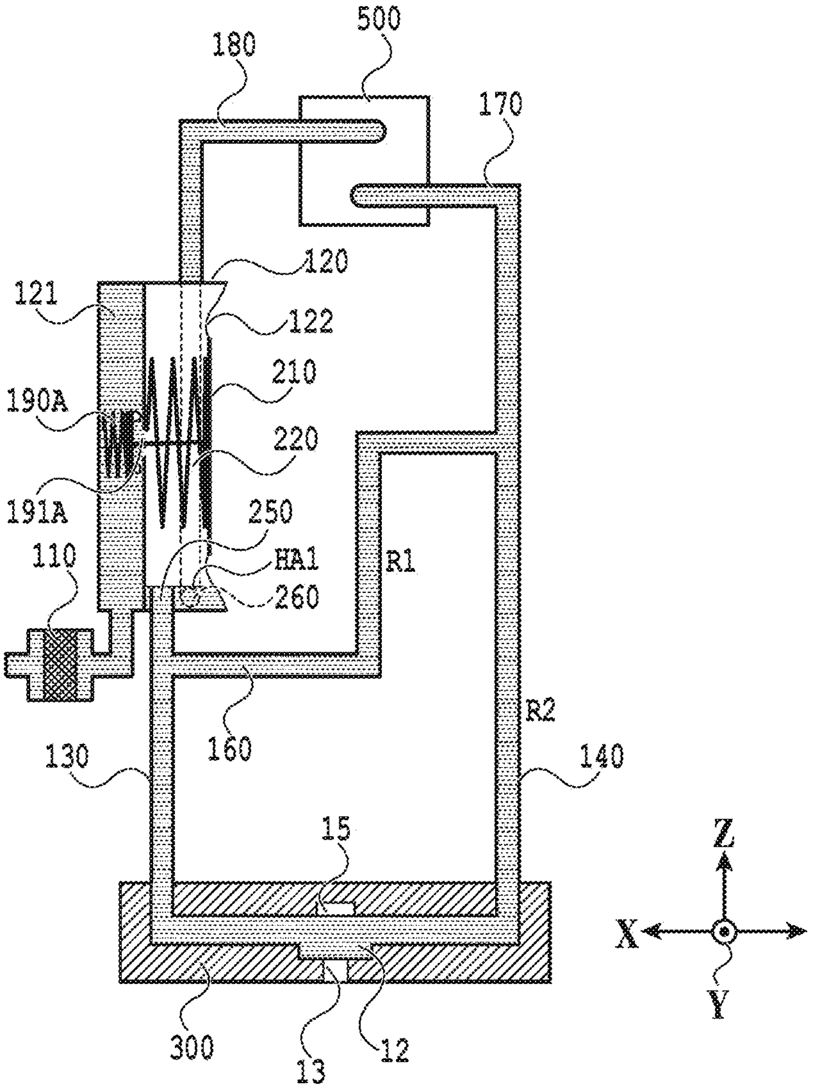
FIG. 22 is a diagram schematically illustrating the circulation path in a first modification.

FIG. 22 is a diagram schematically illustrating the circulation path in a first modification. In the present modification, the supply port 260 is provided vertically lower than the discharge port 250. In addition, a flow resistance in the channel that flows to the collection channel 140 through the bypass channel 160 is a resistance R1, and a resistance in the channel that flows from the supply channel 130 to the collection channel 140 through the ejection module 300 is a flow resistance R2. The amount of the ink flowing in each channel has a relationship of an inverse proportion to the magnitude of the corresponding flow resistance, and a ratio between the flow rate in the channel through the bypass channel 160 and the flow rate in the channel through the ejection module 300 is R2 to R1. According to this relationship, each flow resistance is adjusted so as to obtain a circulation amount (a flow velocity) that can suppress the thickening of the ink in the vicinity of the ejection port 13 in the ejection module 300. That is, the flow resistance R1 and the flow resistance R2 are adjusted such that the flow velocity of the liquid in the pressure chamber 12 is equal to or greater than a predetermined value. Since the relationship between the flow resistance R1 and the flow resistance R2 is changed depending on a channel cross-sectional area or a channel length in the apparatus, it is desired to perform the adjustment according to the apparatus as needed. It is possible to adjust the flow resistance R1 and the flow resistance R2 by changing the channel cross-sectional area or the channel length or providing a restrictor.

Thus, it is possible to suppress the thickening of the ink by adjusting the flow resistance R1 and the flow resistance R2.

<Second Modification>

Figure 23:
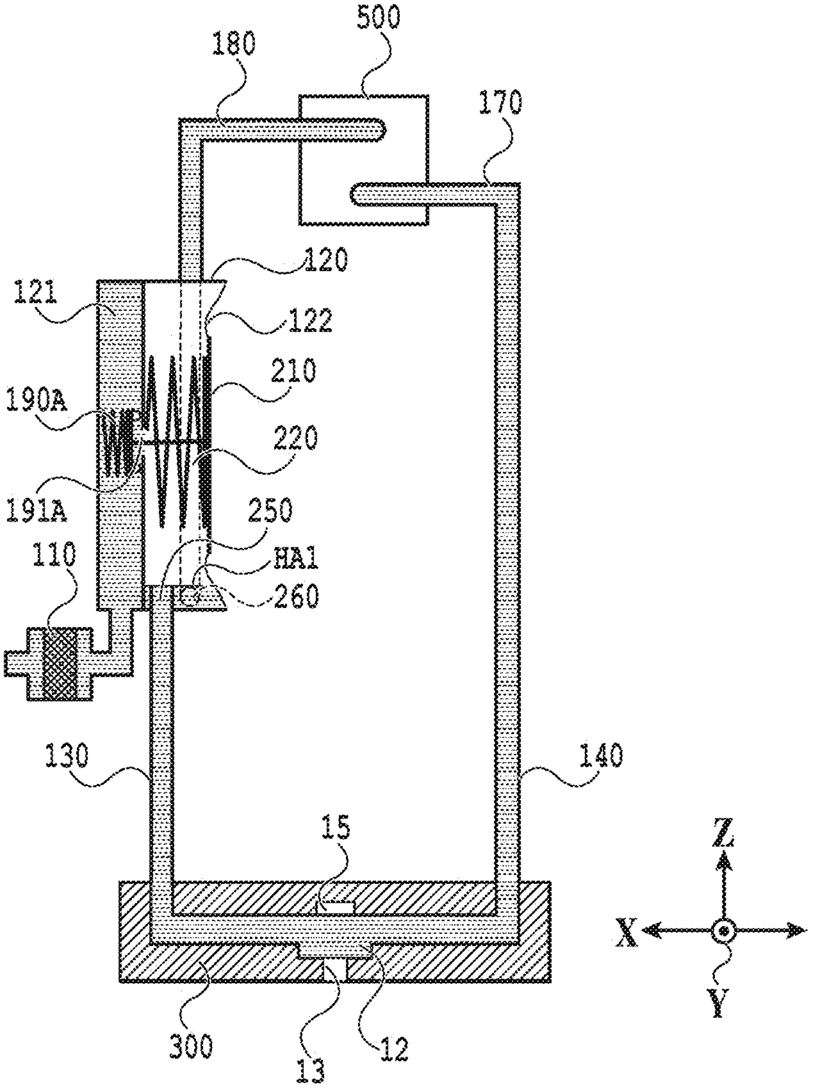
FIG. 23 is a diagram schematically illustrating the circulation path in a second modification.

FIG. 23 is a diagram schematically illustrating the circulation path in a second modification. In this mode, in a case where the ink ejection from the ejection module 300 is increased, the pressure loss is increased because the amount of the ink flowing through the supply channel 130 is increased, and the negative pressure in the pressure chamber 12 is increased. Additionally, it is possible to change the flow rate in the circulation pump 500 arbitrarily by changing the driving voltage and a driving frequency inputted to the piezoelectric element.

Therefore, in the present modification, in addition to the configuration in which the supply port 260 is provided vertically lower than the liquid surface HA1, the input to the circulation pump 500 is changed according to the duty of the printing operation. Thus, it is possible to control the ink flow rate in the supply channel and to control the negative pressure in the pressure chamber 12 to be a predetermined negative pressure.

<Third Modification>

Next, a modification of the circulation channel is described as a third modification. It is possible to obtain the effect of the present invention also with a configuration in which a closed circulation channel is formed by the first pressure control chamber 122, the supply channel 130, the ejection module 300, and the circulation pump 500.

<Fourth Modification>

Figure 24:
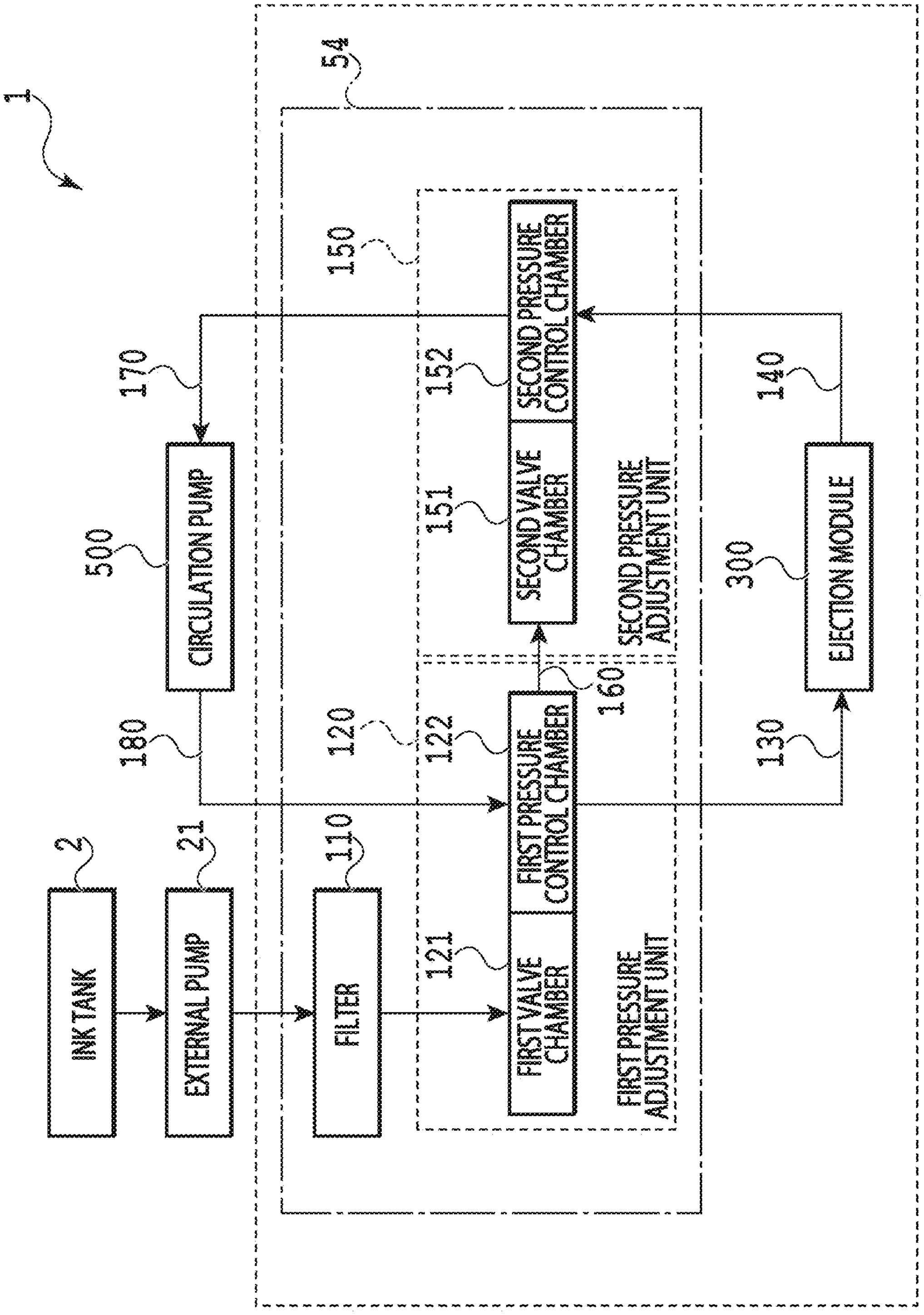
FIG. 24 is a block diagram schematically illustrating the circulation path in a fourth modification.

FIG. 24 is a block diagram schematically illustrating the circulation path in a fourth modification. The present modification is an example of the third modification in which the circulation pump 500 mounted in the liquid ejection head 1 is disposed on a main body side of the liquid ejection apparatus 50. With this, a part of the pump inlet channel 170 and a part of the pump outlet channel 180 are also arranged outside the liquid ejection head 1. As with the configurations described so far, it is possible to improve the ejection stability also in this configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-079388, filed May 12, 2023, and No. 2024-030353, filed Feb. 29, 2024, which are hereby incorporated by reference herein in their entirety.

What is claimed is:

1. A liquid ejection head, comprising:

an ejection module that ejects a liquid; and a pressure control chamber to adjust a pressure of the liquid supplied to the ejection module, wherein the liquid is circulated by a circulation pump, which collects the liquid from the ejection module and supplies the liquid to the pressure control chamber, in an order from the circulation pump, the pressure control chamber, the ejection module, and the circulation pump, the pressure control chamber includes a discharge port to discharge the liquid to the ejection module and a supply port to which the liquid is supplied from the circulation pump, an opening of the circulation pump connected with the supply port is positioned higher than the discharge port in a vertical direction in a usage orientation of the liquid ejection head, the discharge port is positioned higher than the supply port in the vertical direction or at the same height as that of the supply port in the vertical direction in the usage orientation of the liquid ejection head, a first channel connects the discharge port and the ejection module with each other, a second channel connects the ejection module and the circulation pump with each other, and a bypass channel connects the first channel and the second channel with each other.

2. The liquid ejection head according to claim 1, wherein the uppermost portion of the opening of the circulation pump connected with the supply port is positioned higher than the uppermost portion of the discharge port in the vertical direction in the usage orientation of the liquid ejection head.

3. The liquid ejection head according to claim 1, wherein the uppermost portion of the discharge port is positioned higher than the uppermost portion of the supply port in the vertical direction or at the same height as that of the uppermost portion of the supply port in the vertical direction in the usage orientation of the liquid ejection head.

4. The liquid ejection head according to claim 1, wherein the lowermost portion of the discharge port is positioned higher than the uppermost portion of the supply port in the vertical direction in the usage orientation of the liquid ejection head.

5. The liquid ejection head according to claim 1, wherein the discharge port opens in a horizontal direction, and the supply port opens in the vertical direction in the usage orientation of the liquid ejection head.

6. The liquid ejection head according to claim 1, wherein in a state in which the circulation pump is stopped, the discharge port and the supply port are in liquid communication.

7. The liquid ejection head according to claim 1, wherein the discharge port and the supply port are positioned lower than a central portion of the pressure control chamber in the vertical direction.

8. The liquid ejection head according to claim 1, further comprising the circulation pump.

9. The liquid ejection head according to claim 1, wherein the circulation pump delivers the liquid by changing a pressure in a pump chamber, and the pressure in the pump chamber is changed by driving a pressure variation unit provided in the pump chamber.

10. The liquid ejection head according to claim 9, wherein the pressure variation unit is a piezoelectric element.

11. The liquid ejection head according to claim 1, wherein in the pressure control chamber, a part of a surface is formed of a flexible member that is formed to be displaceable, the pressure control chamber includes a pressure plate that is displaceable in conjunction with the flexible member and a bias member that biases the pressure plate in a direction in which a volume of the pressure control chamber is increased, and the pressure control chamber adjusts a pressure according to the displacement of the pressure plate and the flexible member.

12. The liquid ejection head according to claim 1, wherein the pressure control chamber includes an inlet port into which the liquid can flow through a filter and supplies through the filter the liquid to a circulation path through which the liquid circulated by the circulation pump flows.

13. The liquid ejection head according to claim 1, wherein the ejection module is positioned lower than the pressure control chamber in the vertical direction.

14. The liquid ejection head according to claim 1, wherein a flow resistance in a first path, which is a path of the liquid that flows from the first channel to the second channel through the bypass channel, and a flow resistance in a second path, which is a path of the liquid that flows from the first channel to the second channel through the ejection module, are set such that a flow velocity in the ejection module is equal to or greater than a predetermined flow velocity.

15. A liquid ejection apparatus, comprising:

an ejection module that ejects a liquid;

a pressure control chamber to adjust a pressure of the liquid supplied to the ejection module; and a circulation pump that collects the liquid from the ejection module and supplies the liquid to the pressure control chamber, wherein the liquid is circulated by the circulation pump in an order from the circulation pump, the pressure control chamber, the ejection module, and the circulation pump, the pressure control chamber includes a discharge port to discharge the liquid to the ejection module and a supply port to which the liquid is supplied from the circulation pump, an opening of the circulation pump connected with the supply port is positioned higher than the discharge port in a vertical direction in a usage orientation of the liquid ejection apparatus, the discharge port is positioned higher than the supply port in the vertical direction or at the same height as that of the supply port in the vertical direction in the usage orientation of the liquid ejection apparatus, a first channel connects the discharge port and the ejection module with each other, a second channel connects the ejection module and the circulation pump with each other, and a bypass channel connects the first channel and the second channel with each other.

16. The liquid ejection apparatus according to claim 15, wherein the uppermost portion of the opening of the circulation pump connected with the supply port is positioned higher than the uppermost portion of the discharge port in the vertical direction in the usage orientation of the liquid ejection apparatus, and the uppermost portion of the discharge port is positioned higher than the uppermost portion of the supply port in the vertical direction or at the same height as that of the uppermost portion of the supply port in the vertical direction in the usage orientation of the liquid ejection apparatus.

17. The liquid ejection apparatus according to claim 15, wherein the lowermost portion of the discharge port is positioned higher than the uppermost portion of the supply port in the vertical direction in the usage orientation of the liquid ejection apparatus.

18. The liquid ejection apparatus according to claim 15, wherein the discharge port opens in a horizontal direction, and the supply port opens in the vertical direction in the usage orientation of the liquid ejection apparatus.

19. The liquid ejection apparatus according to claim 15, wherein in a state in which the circulation pump is stopped, the discharge port and the supply port are in liquid communication.

* * * * *